(12) United States Patent
Kamei et al.

(10) Patent No.: US 11,006,368 B2
(45) Date of Patent: May 11, 2021

(54) COMMUNICATION PROCESSING SYSTEM, COMMUNICATION PROCESSING METHOD, COMMUNICATION PROCESSING APPARATUS, COMMUNICATION TERMINAL, AND CONTROL METHODS AND CONTROL PROGRAMS THEREOF

(71) Applicant: NEC CORPORATION, Tokyo (JP)

(72) Inventors: Akira Kamei, Tokyo (JP); Yumiko Okuyama, Tokyo (JP); Toru Yamada, Tokyo (JP); Kyoji Hirata, Tokyo (JP); Masahiro Serizawa, Tokyo (JP); Masashi Shimoma, Tokyo (JP); Satoshi Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/483,297

(22) PCT Filed: Jan. 10, 2018

(86) PCT No.: PCT/JP2018/000359
§ 371 (c)(1),
(2) Date: Aug. 2, 2019

(87) PCT Pub. No.: WO2018/142861
PCT Pub. Date: Aug. 9, 2018

(65) Prior Publication Data
US 2020/0015168 A1 Jan. 9, 2020

(30) Foreign Application Priority Data
Feb. 3, 2017 (JP) .............................. JP2017-018827

(51) Int. Cl.
*H04W 52/02* (2009.01)
*H04B 17/318* (2015.01)
(Continued)

(52) U.S. Cl.
CPC ...... *H04W 52/0245* (2013.01); *H04B 17/318* (2015.01); *H04W 4/70* (2018.02);
(Continued)

(58) Field of Classification Search
CPC ..... H04W 88/04; H04W 76/14; H04W 8/005; H04W 76/10; H04W 40/22
See application file for complete search history.

(56) References Cited

U.S. PATENT DOCUMENTS

2015/0142004 A1 5/2015 Gleason et al.
2018/0027475 A1* 1/2018 Li .................... H04W 24/02
455/426.1

(Continued)

FOREIGN PATENT DOCUMENTS

JP 2001-078242 A 3/2001
JP 2002-058075 A 2/2002
(Continued)

OTHER PUBLICATIONS

"3rd Generation Partnership Project; Technical Specification Group Services and System Aspects; Proximity-based services (ProSe); Stage 2 (Release 14)", 3GPP TS 23.303 V14.1.0, Dec. 2016, 15 pages.

(Continued)

*Primary Examiner* — Jung H Park

(57) ABSTRACT

This invention provides a communication processing system that reduces the power consumption of a remote UE associated with measurement of a strength of a received signal. The communication processing system includes a communication terminal, a base station, relay stations that relay communication between the communication terminal and the base station, a measurer that measures, in the communication terminal, a strength of a signal received from one of the relay stations, and a controller that controls to reselect (Continued)

another of the relay stations if the measured strength of the received signal is smaller than a first threshold, and reduce a count of measuring the strength of the received signal by the measurer if the measured strength of the received signal is larger than the second threshold which is larger than the first threshold.

12 Claims, 34 Drawing Sheets

(51) Int. Cl.
*H04W 4/70* (2018.01)
*H04W 76/23* (2018.01)
*H04W 8/00* (2009.01)
*H04W 40/22* (2009.01)
*H04W 40/24* (2009.01)
*H04W 88/04* (2009.01)

(52) U.S. Cl.
CPC .......... *H04W 8/005* (2013.01); *H04W 40/22* (2013.01); *H04W 40/246* (2013.01); *H04W 76/23* (2018.02); *H04W 88/04* (2013.01)

(56) References Cited

U.S. PATENT DOCUMENTS

2018/0317268 A1* 11/2018 Kim .................... H04W 40/246
2019/0349722 A1* 11/2019 Lee ........................ H04W 4/90

FOREIGN PATENT DOCUMENTS

| JP | 2004-242017 A | 8/2004 |
| JP | 2005-347906 A | 12/2005 |
| JP | 2008-131510 A | 6/2008 |
| JP | 2014-068190 A | 4/2014 |
| JP | 2016-522605 A | 7/2016 |
| WO | 2016/158996 A1 | 10/2016 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.6.0, Dec. 2016, 20 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Overall description; (Release 14)", 3GPP TS 36.300 V14.1.0, Dec. 2016, 8 pages.

International Search Report for PCT/JP2018/000359, dated Apr. 3, 2018.

Communication dated Oct. 6, 2020, from the Japanese Patent Office in Application No. 2018-566009.

* cited by examiner

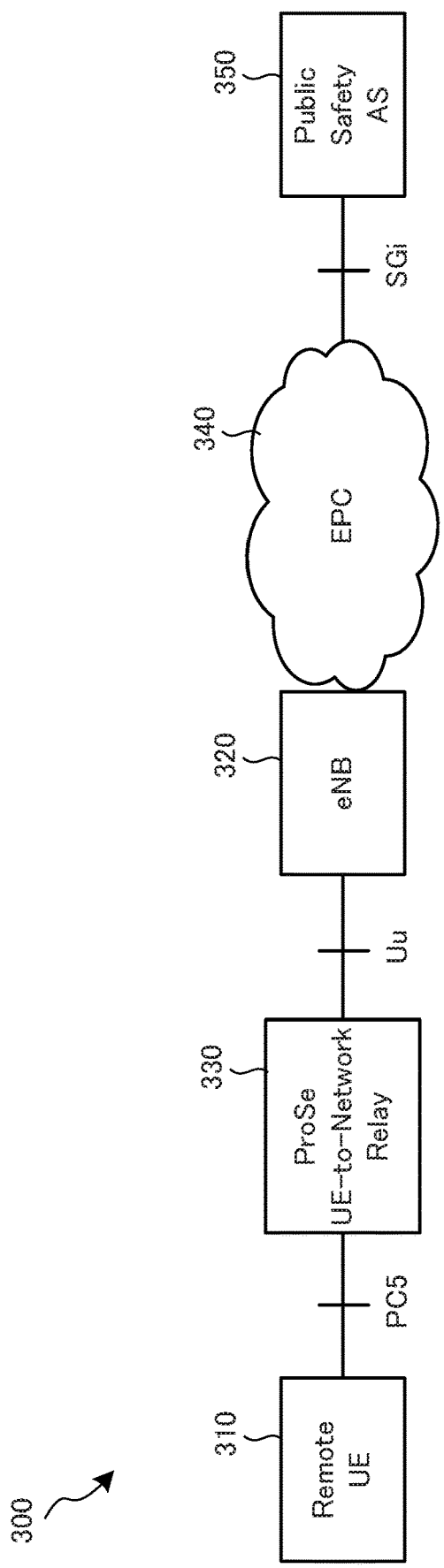

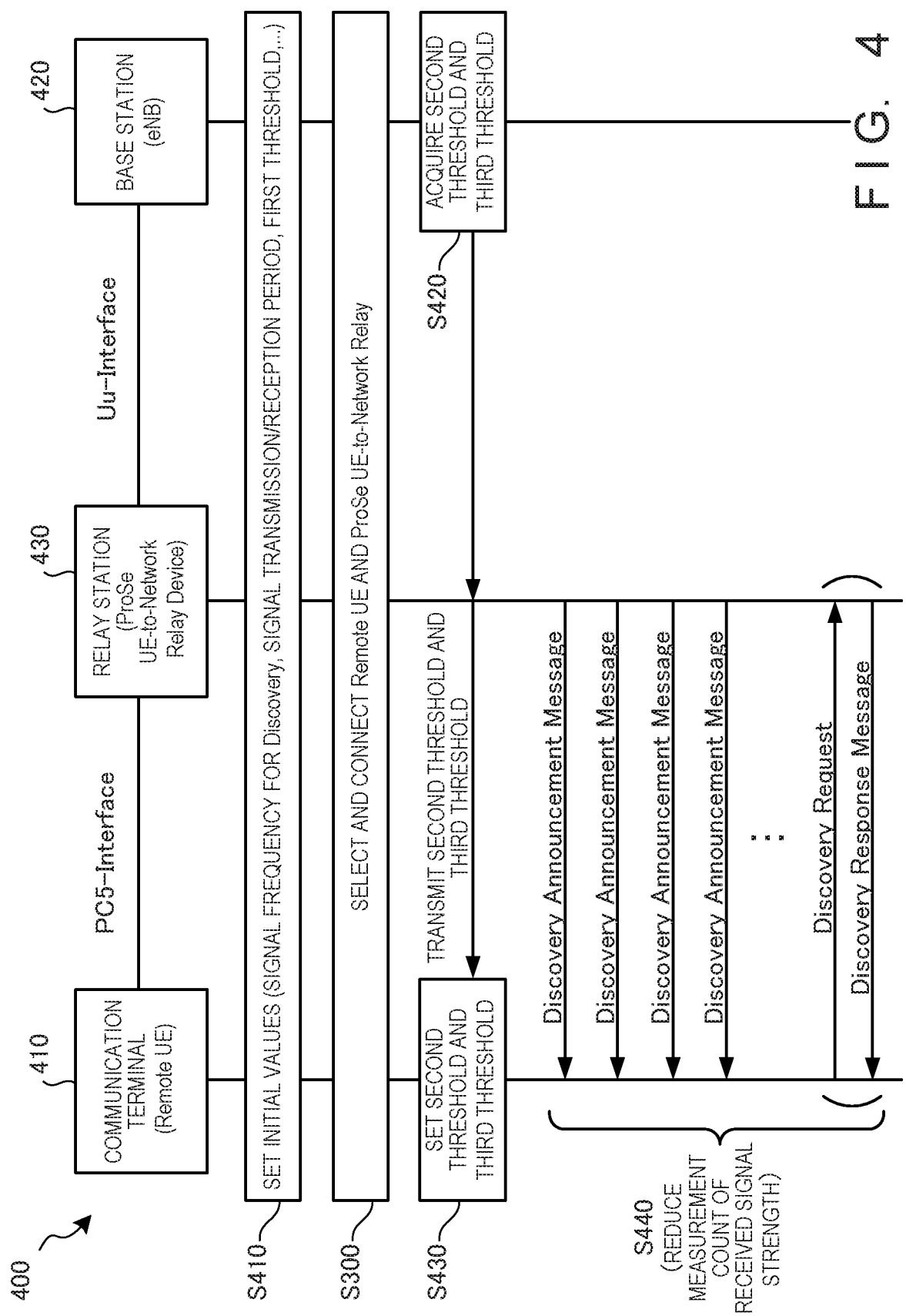

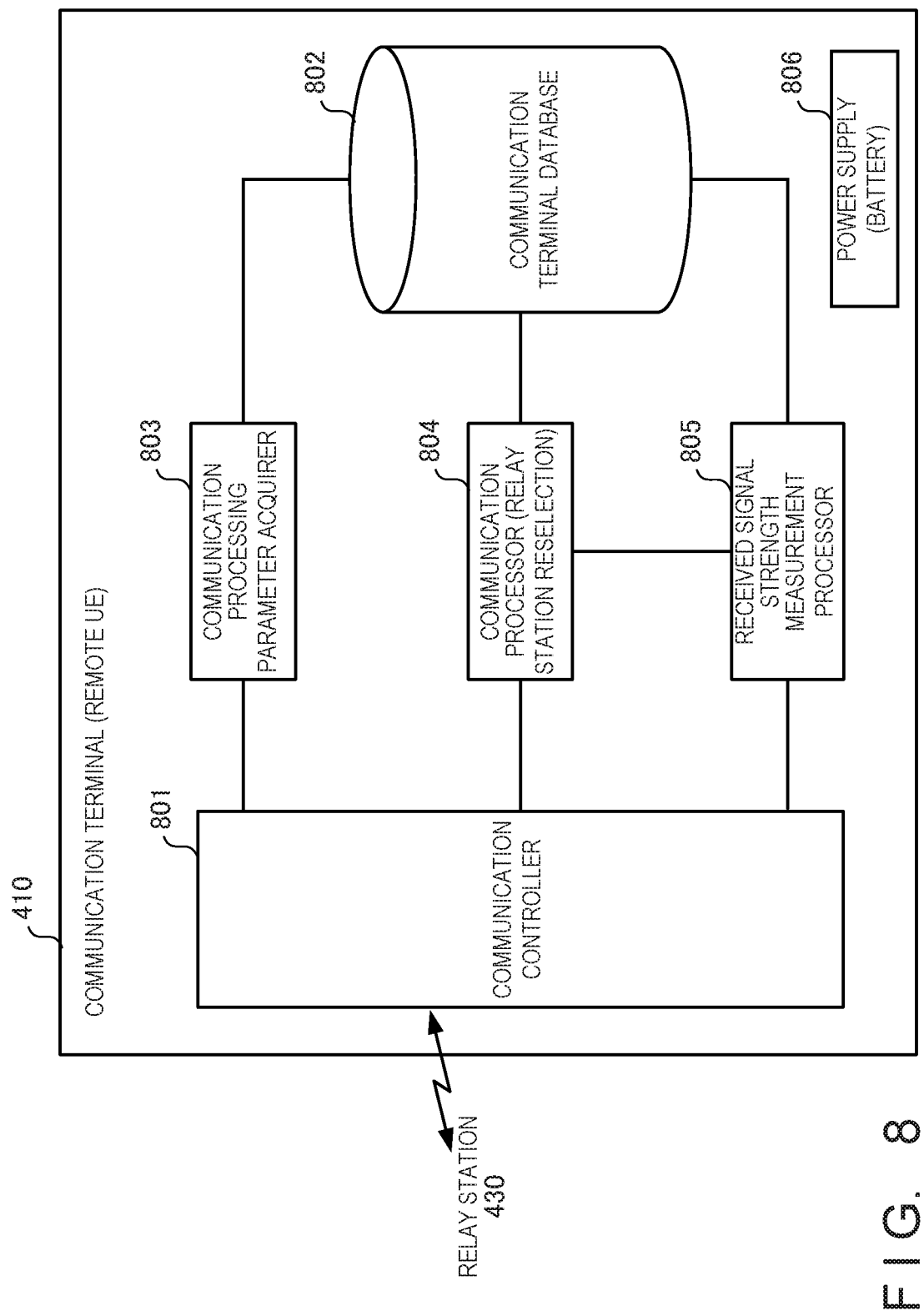
F I G. 8

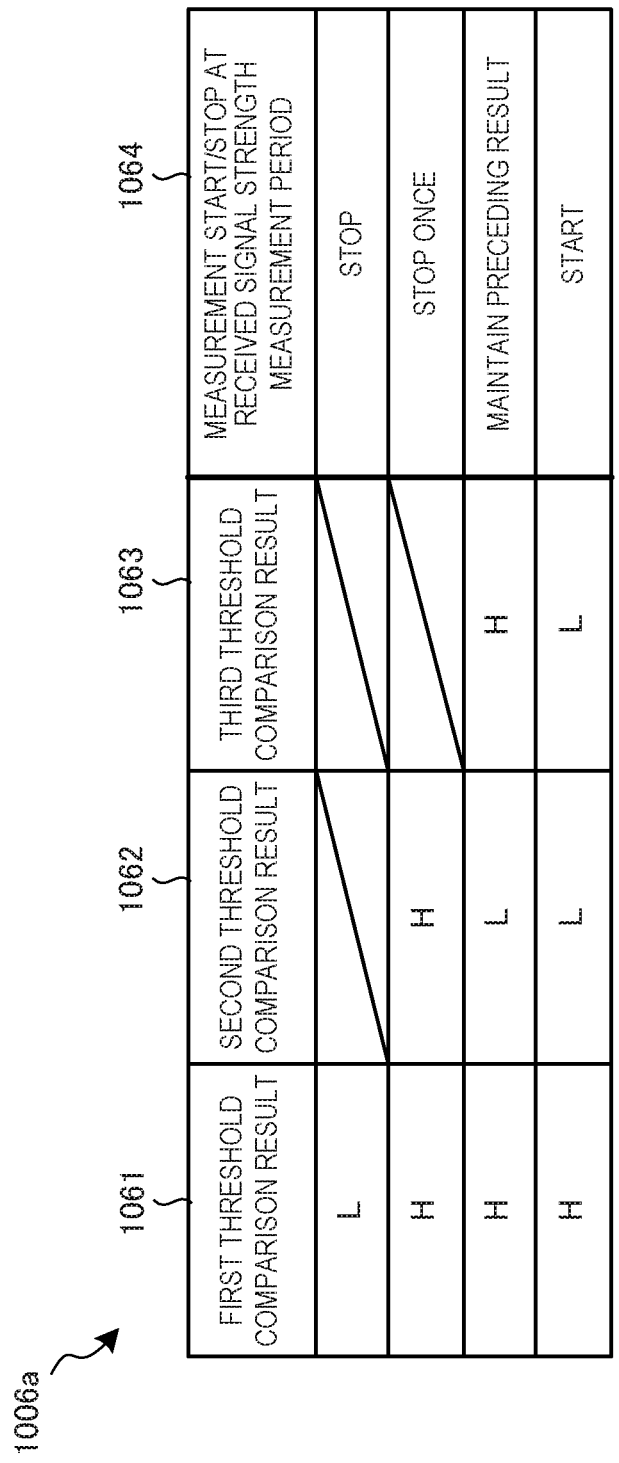
F I G. 10B

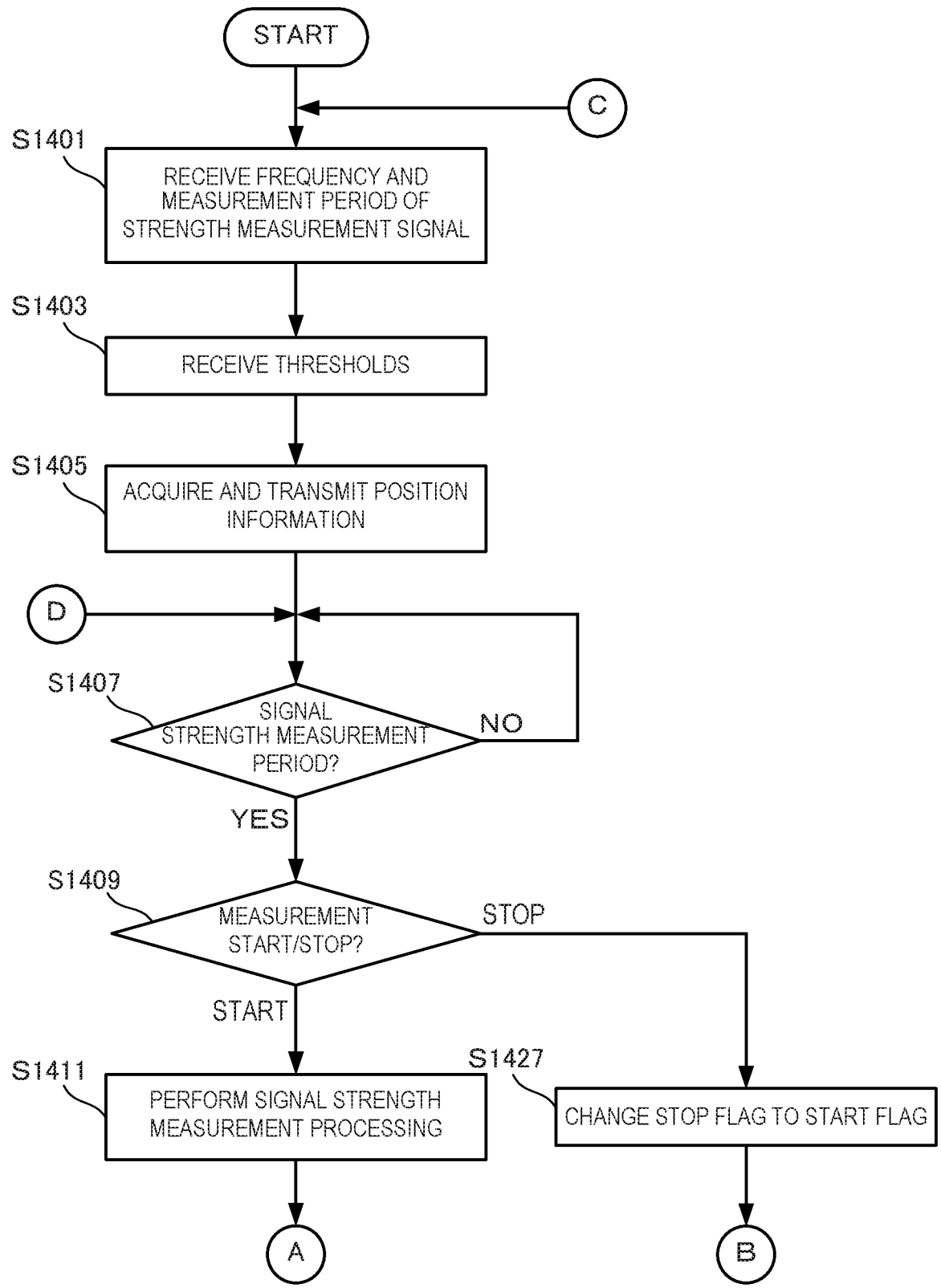
F I G. 14A

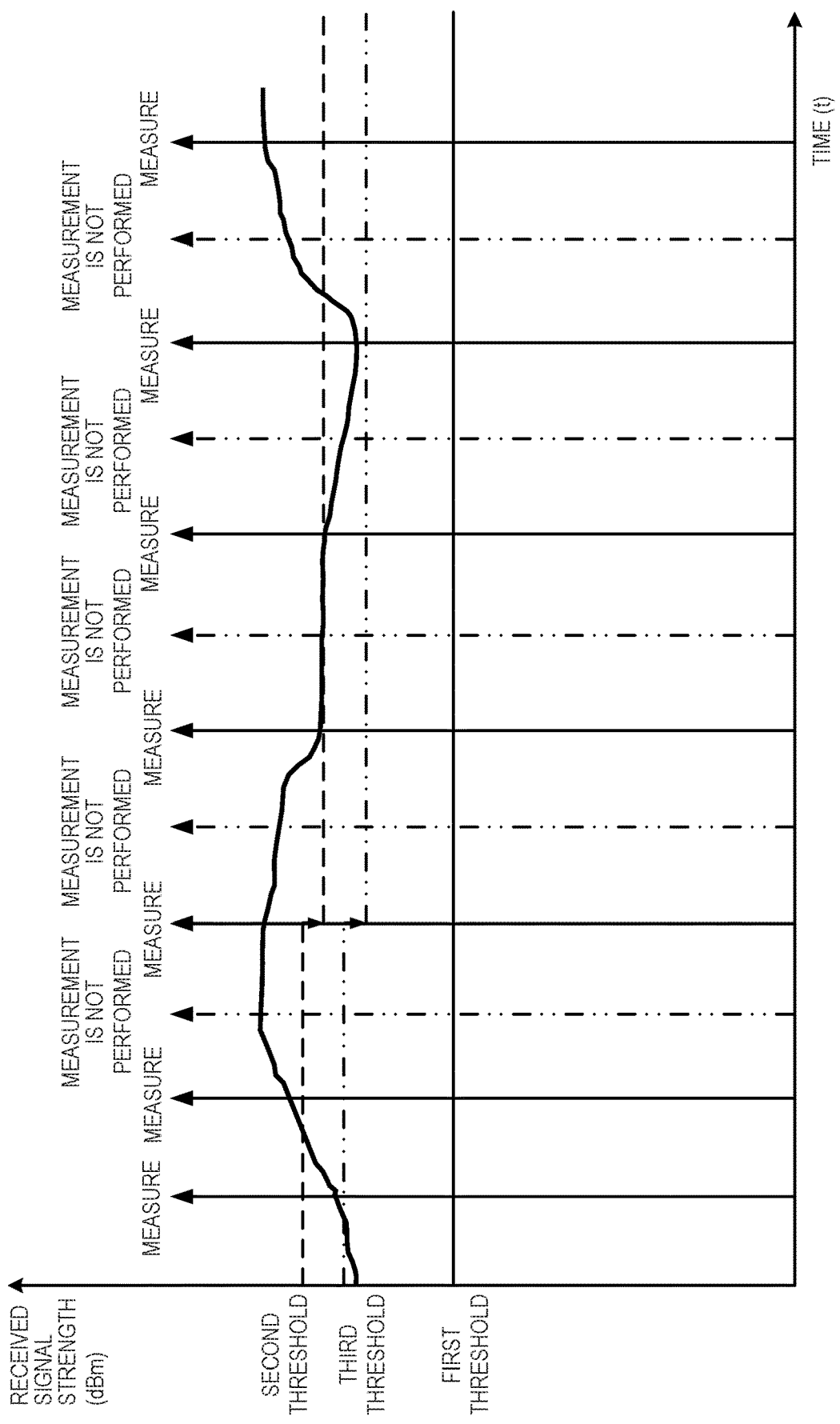
F I G. 18

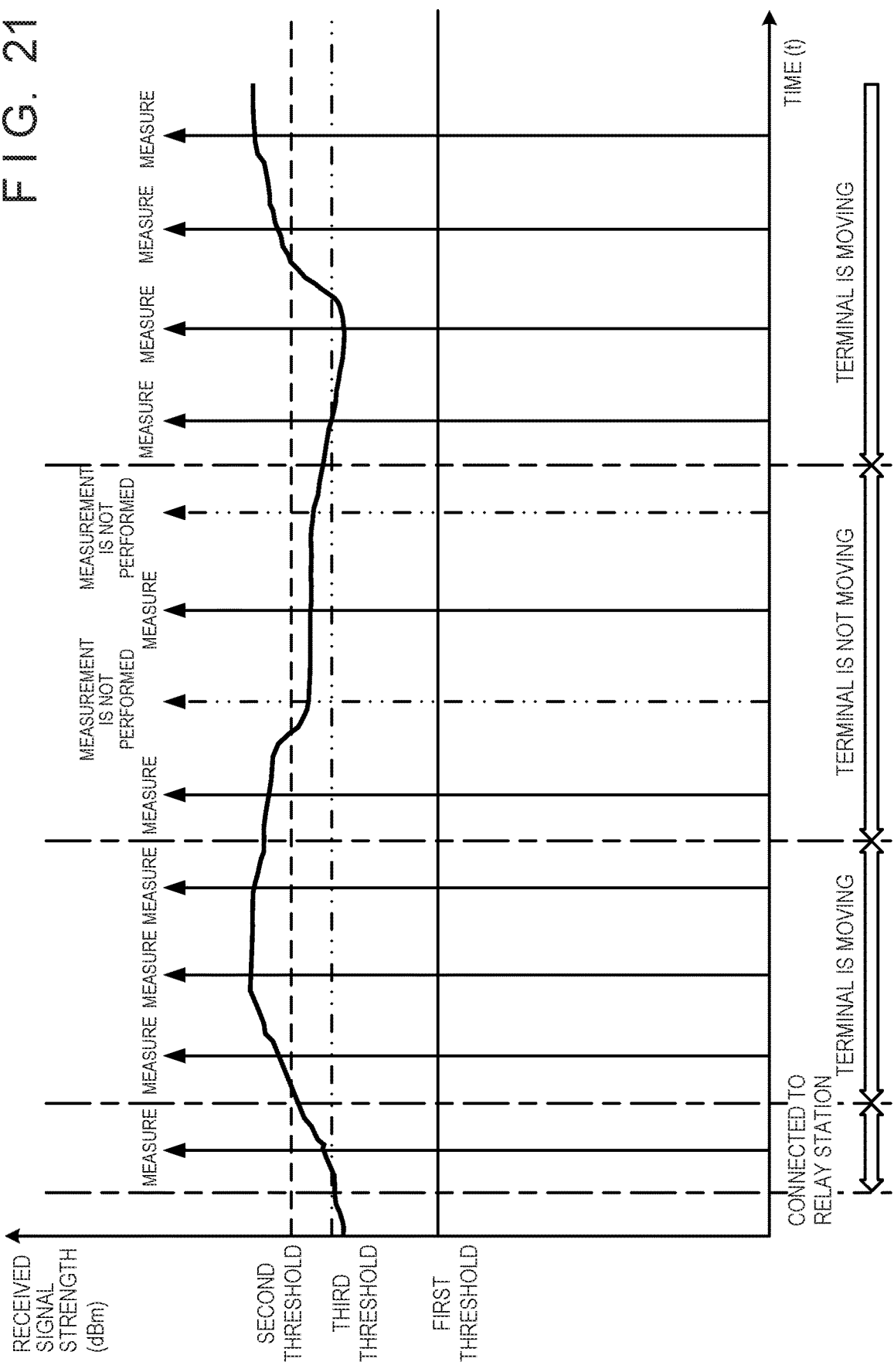

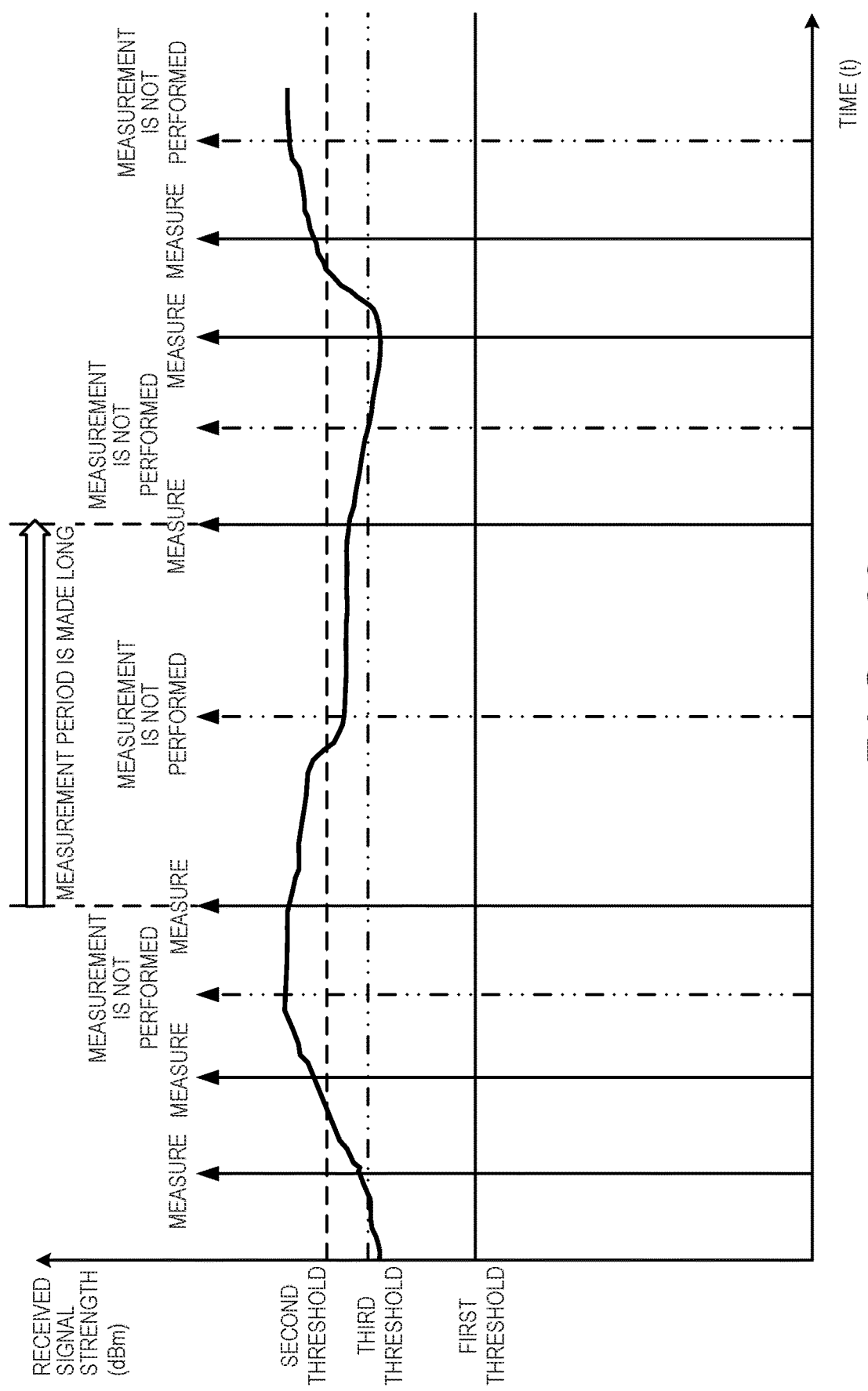
F I G. 23

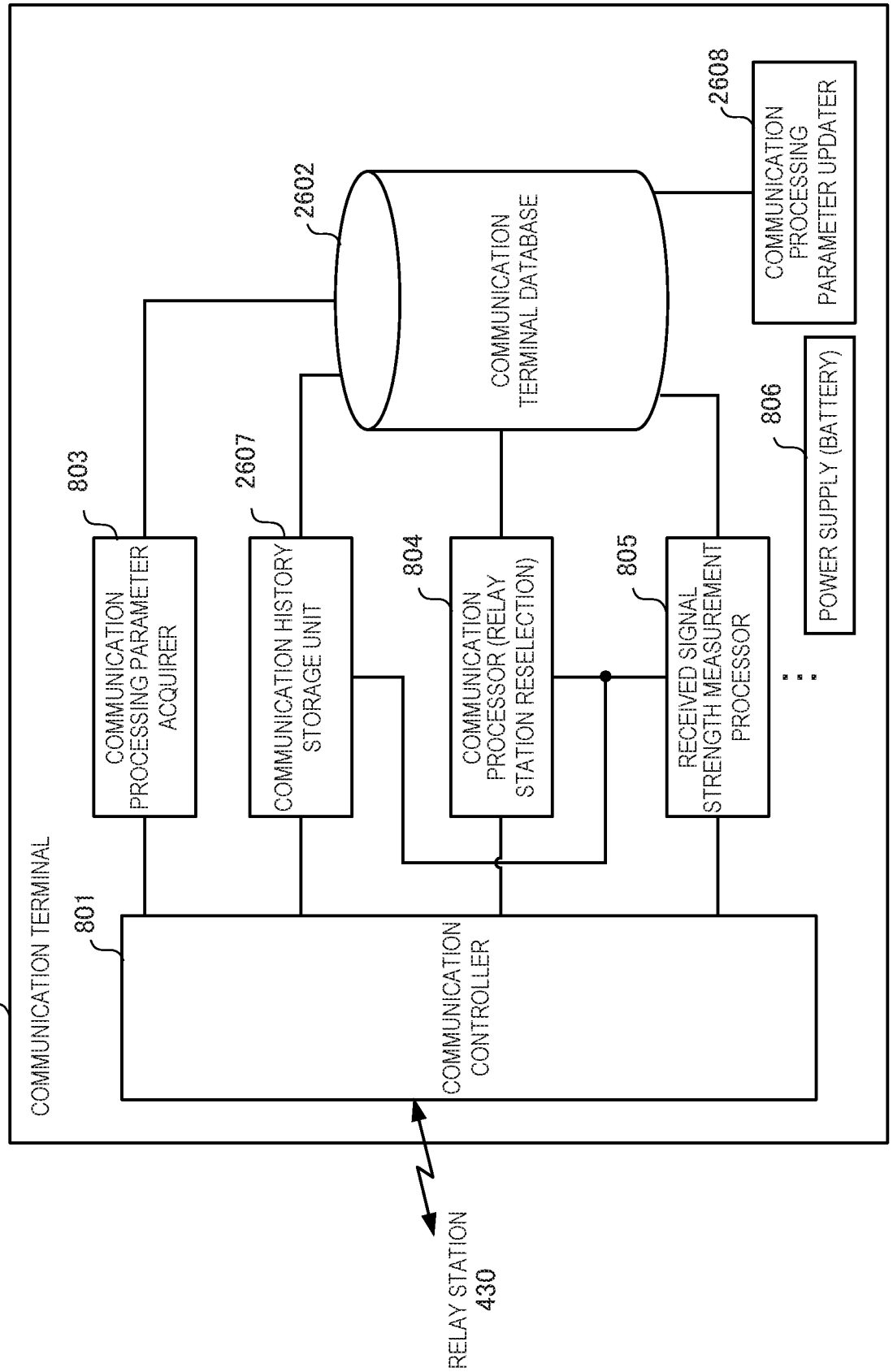

COMMUNICATION PROCESSING SYSTEM, COMMUNICATION PROCESSING METHOD, COMMUNICATION PROCESSING APPARATUS, COMMUNICATION TERMINAL, AND CONTROL METHODS AND CONTROL PROGRAMS THEREOF

CROSS REFERENCE TO RELATED APPLICATIONS

This application is a National Stage of International Application No. PCT/JP2018/000359 filed Jan. 10, 2018, claiming priority based on Japanese patent application No. 2017-018827, filed on Feb. 3, 2017, the disclosure of which is incorporated herein in its entirety by reference.

TECHNICAL FIELD

The present invention relates to a communication processing system, a communication processing method, a communication processing apparatus, a communication terminal, and control methods and control programs thereof.

BACKGROUND ART

Currently, the 3GPP is examining a method of transmitting data from a remote device (remote UE: Remote User Equipment) to a base station via a relay device (relay UE: Relay User Equipment/UE-to-Network Relay device), and methods are disclosed in non-patent literatures 1 and 2.

In non-patent literature 1, an architecture model is described in "4.4.3 ProSe UE-to-Network Relay for Public Safety", and a procedure of establishing ProSe (D2D) connection via UE-to-Network Relay is described in Figure 5.4.4.1-1 in "5.4.4 Direct communication via ProSe UE-to-Network Relay". The explanation of Figure 5.4.4.1-1 includes an account saying "even after the connection using the relay UE, to reselect a relay UE, the remote UE continuously measures the signal strength of the discovery message sent from the relay UE" (see non-patent literature 1, p. 102, lines 14-21).

Additionally, "23.10.4 Sidelink Communication via ProSe UE-to-Network Relay" in non-patent literature 2 writes that "a remote UE selects the relay UE of the highest PC5 link quality, and if the signal strength of the PC5 link is less than a preset threshold, a relay UE reselection process is performed" (see non-patent literature 2, p. 283, lines 1-8).

In the above technical field, patent literature 1 discloses a technique of transmitting measured communication quality from a communication terminal to a relay device. In addition, patent literature 2 discloses a technique of comparing the measurement value of signal quality received from a base station with a first threshold in a communication terminal to determine the signal quality and comparing the signal quality with a second threshold lower than the first threshold to determine whether to perform "narrowband supplementation" or "complete supplementation". Furthermore, patent literature 3 starts a technique of measuring, by a communication terminal, a strength of a signal received from a base station, comparing it with a plurality of thresholds, and setting different measurement interval factors.

CITATION LIST

Patent Literature

Patent literature 1: Japanese Patent Laid-Open No. 2014-068190
Patent literature 2: Japanese Patent Laid-Open No. 2002-058075
Patent literature 3: U.S. Patent Application Publication No. 2015/0142004

Non-Patent Literature

Non-patent literature 1: 3GPP TS 23.303 V 14.1.0 (2016-12) Proximity-based service (ProSe)
Non-patent literature 2: 3GPP TS 36.300 V 13.6.0 (2016-12) E-UTRAN Overall description

SUMMARY OF THE INVENTION

Technical Problem

As described above, to prepare for reselection of a relay UE, the remote UE needs to measure the strength of the received signal of a UE-to-Network Relay Discovery Announcement message sent from the relay UE at a predetermined interval or a UE-to-Network Relay Discovery Response message sent from the relay UE in response to a request from the remote UE. For this reason, the power consumption of the remote UE increases. The influence is particularly large in an IoT (Internet of Thing s)/MTC (Machine Type Communication)/M2M (Machine to Machine) device that operates by a battery and needs to guarantee an operation period of several to 10 years. The techniques described in the above literatures cannot reduce the power consumption of the remote UE associated with the measurement of the strength of the received signal.

The present invention enables to provide a technique of solving the above-described problem.

Solution to Problem

One example aspect of the present invention provides a communication processing system comprising:
a communication terminal;
a base station;
relay stations that relay communication between the communication terminal and the base station;
a measurer in the communication terminal that measures a strength of a signal received from one of the relay stations; and
a controller that controls to reselect another of the relay stations if the measured strength of the received signal is smaller than a first threshold, and to reduce a count of measuring the strength of the received signal by the measurer if the measured strength of the received signal is larger than a second threshold which is larger than the first threshold.

Another example aspect of the present invention provides a communication processing method of a communication processing system including a communication terminal, a base station, and relay stations that relay communication between the communication terminal and the base station, comprising:
measuring, in the communication terminal, a strength of a signal received from one of the relay stations; and
controlling to reselect another of the relay stations if the measured strength of the received signal is smaller than a first threshold, and to reduce a count of measuring the strength of the received signal if the measured strength of the received signal is larger than the second threshold which is larger than the first threshold.

Still other example aspect of the present invention provides a communication terminal comprising:

a measurer that measures a strength of a signal received from one of relay stations that relay communication between the communication terminal and a base station; and a controller that controls to reselect another of the relay stations if the measured strength of the received signal is smaller than a first threshold, and to reduce a count of measuring the strength of the received signal by the measurer if the measured strength of the received signal is larger than the second threshold which is larger than the first threshold.

Still other example aspect of the present invention provides a control method of a communication terminal, comprising:

measuring a strength of a signal received from one of relay stations that relay communication between the communication terminal and a base station; and controlling to reselect another of the relay stations if the measured strength of the received signal is smaller than a first threshold, and reduce a count of measuring the strength of the received signal if the measured strength of the received signal is larger than the second threshold which is larger than the first threshold.

Still other example aspect of the present invention provides a communication terminal control program for causing a computer to execute a method, comprising:

measuring a strength a signal received from one of relay stations that relay communication between a communication terminal and a base station; and controlling to reselect another of the relay stations if the measured strength of the received signal is smaller than a first threshold, and reduce a count of measuring the strength of the received signal if the measured strength of the received signal is larger than the second threshold which is larger than the first threshold.

Still other example aspect of the present invention provides a communication processing apparatus comprising:

a timing setter that sets, to a communication terminal and one of relay stations, a timing at which the communication terminal measures a strength of a signal received from the one of the relay stations that relay communication between the communication terminal and the communication processing apparatus;

a threshold setter that sets, to the communication terminal, a first threshold to be compared with the strength of the received signal measured by the communication terminal to determine whether or not to reselect another of the relay stations, and a second threshold used to control to reduce a count of measuring the strength of the received signal if the strength of the received signal measured by the communication terminal is larger than the second threshold which is larger than the first threshold; and an updater that updates setting of at least the second threshold based on a history of the strength of the received signal measured by the communication terminal.

Still other example aspect of the present invention provides a control method of a communication processing apparatus, comprising:

setting, to a communication terminal and one of relay stations, a timing at which the communication terminal measures a strength of a signal received from the one of the relay stations that relay communication between the communication terminal and the communication processing apparatus;

setting, to the communication terminal, a first threshold to be compared with the strength of the received signal measured by the communication terminal to determine whether or not to reselect another of the relay stations, and a second threshold used to control to reduce a count of measuring the strength of the received signal if the strength of the received signal measured by the communication terminal is larger than the second threshold which is larger than the first threshold; and updating setting of at least the second threshold based on a history of the strength of the received signal measured by the communication terminal.

Still other example aspect of the present invention provides a communication processing apparatus control program for causing a computer to execute a method, comprising:

setting, to a communication terminal and one of relay stations, a timing at which the communication terminal measures a strength of a signal received from the one of the relay stations that relay communication between the communication terminal and the communication processing apparatus;

setting, to the communication terminal, a first threshold to be compared with the strength of the received signal measured by the communication terminal to determine whether or not to reselect another of the relay stations, and a second threshold used to control to reduce a count of measuring the strength of the received signal if the strength of the received signal measured by the communication terminal is larger than the second threshold which is larger than the first threshold; and updating setting of at least the second threshold based on a history of the strength of the received signal measured by the communication terminal.

Advantageous Effects of Invention

According to the present invention, it is possible to reduce the power consumption of the remote UE associated with the measurement of the strength of the received signal.

BRIEF DESCRIPTION OF DRAWINGS

FIG. 3A is a block diagram showing the standard arrangement of a communication processing system according to a technical premise;

FIG. 4 is a sequence chart showing the operation of a communication processing system according to the second example embodiment of the present invention;

FIG. 8 is a block diagram showing the functional arrangement of a communication terminal (remote UE) according to the second example embodiment of the present invention;

FIG. 10B is a view showing the arrangement of a start/stop control table according to the second example embodiment of the present invention;

FIG. 14A is a flowchart showing the processing procedure of the communication terminal (remote UE) according to the second example embodiment of the present invention;

FIG. 18 is a view showing the operation of a communication terminal (remote UE) according to the fourth example embodiment of the present invention;

FIG. 21 is a view showing the operation of a communication terminal (remote UE) according to the fifth example embodiment of the present invention;

FIG. 23 is a view showing the operation of a communication terminal (remote UE) according to the sixth example embodiment of the present invention;

FIG. 26A is a block diagram showing the functional arrangement of a communication terminal (remote UE) according to the seventh example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

Figure 1A:
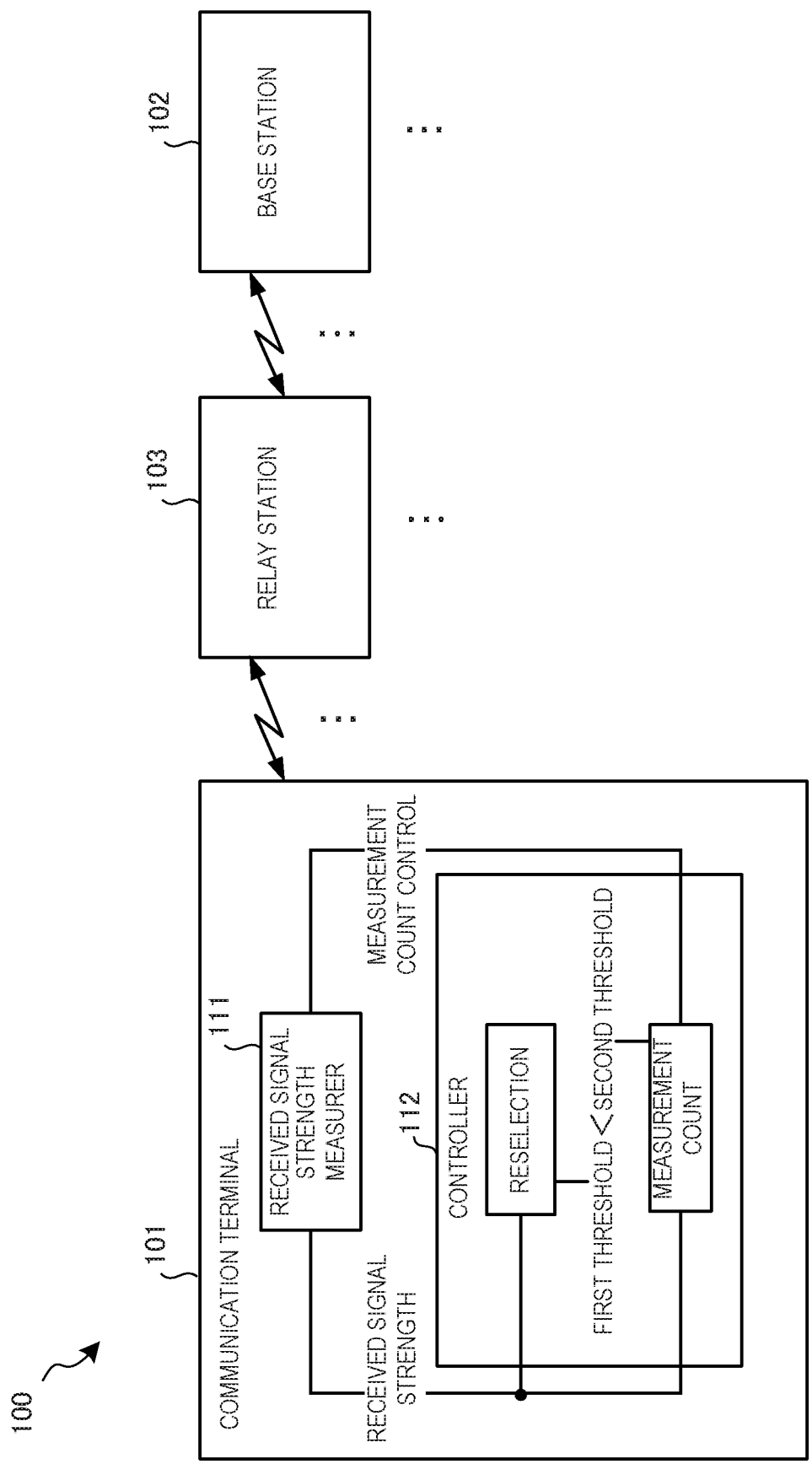
FIG. 1A is a block diagram showing the arrangement of a communication processing system according to the first example embodiment of the present invention.

A communication processing system 100 according to the first example embodiment of the present invention will be described with reference to FIG. 1A. The communication processing system 100 is a system including a relay station.

As shown in FIG. 1, the communication processing system 100 includes a communication terminal 101, a base station 102, a relay station 103, a measurer 111, and a controller 112. The relay station 103 relays communication between the communication terminal 101 and the base station 102. The measurer 111 measures a strength of a signal received from the relay station 103 in the communication terminal 101. The controller 112 controls to reselect the relay station 103 if the measured received signal strength is smaller than a first threshold, compare the measured received signal strength with a second threshold larger than the first threshold, and reduce the measurement count of the strength of the received signal by the measurer 111 if the measured received signal strength is larger than the second threshold. Note that the reduction of the measurement count of the strength of the received signal includes control of reducing the measurement count (measurement frequency) within a predetermined period.

The operation of the communication terminal 101 in the communication processing system 100 according to the first example embodiment of the present invention will be described with reference to FIG. 1B. The operation of the communication terminal 101 shown in FIG. 1B represents the measurement timing of the strength of the received signal from the relay station 103 in the communication terminal 101.

Figure 1B:
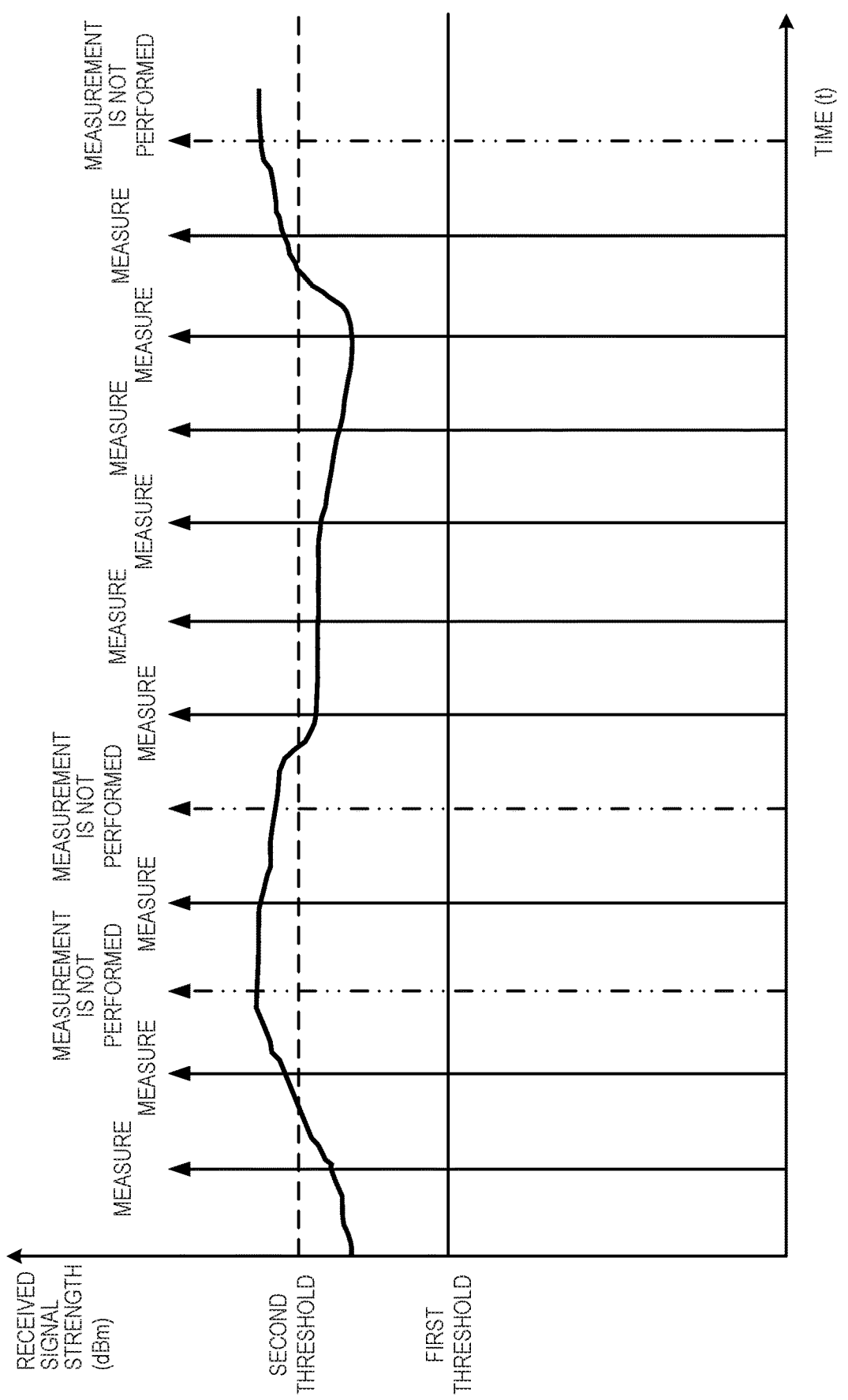
FIG. 1B is a view showing the operation of a communication terminal according to the first example embodiment of the present invention.

In FIG. 1B, the first threshold is a threshold used to reselect a relay station to be connected. When the measured received signal strength from the relay station under connection becomes smaller than the first threshold, it is determined that the communication state with the connected relay station has deteriorated, and processing of reselecting a relay station to be connected more stably is performed. The processing of reselection is not illustrated in FIG. 1B. In FIG. 1B, the second threshold is a threshold used to stop measuring the strength of the received signal at the next period and reduce the measurement count in a case in which the strength of the received signal from the relay station is larger than the second threshold. If the strength of the received signal from the relay station becomes smaller than the second threshold, the stop of measuring the strength of the received signal is canceled, and the measurement is resumed.

As the result of control according to this example embodiment, sequentially from the left of FIG. 1B, measurement (smaller than the second threshold: the next measurement is not stopped), measurement (larger than the second threshold: the next measurement is stopped), stop, measurement (larger than the second threshold: the next measurement is stopped), stop, measurement (smaller than the second threshold: the next measurement is not stopped), measurement (smaller than the second threshold: the next measurement is not stopped), measurement (smaller than the second threshold: the next measurement is not stopped), measurement (smaller than the second threshold: the next measurement is not stopped), measurement (smaller than the second threshold: the next measurement is not stopped), measurement (larger than the second threshold: the next measurement is stopped), stop, . . . are performed. In this example embodiment, of the 12 received signal strength measurement periods, the measurement can be stopped at three periods because of the large measured strength and the stable communication, and the power consumption of the remote UE can be reduced.

According to this example embodiment, it is possible to reduce the measurement count of the strength of the received signal while maintaining the reliability of communication and reduce the power consumption of the remote UE associated with the measurement of the strength of the received signal.

Second Example Embodiment

A communication processing system according to the second example embodiment of the present invention will be described next. In the communication processing system according to this example embodiment, a third threshold smaller than a second threshold serving as a determination criterion used to skip the measurement of a strength of a received signal by a communication terminal is provided. Between the second threshold and the third threshold, whether to skip the measurement or not is maintained. According to this example embodiment, it is possible to reduce the power consumption of the communication terminal more stably than switching, above and below the second threshold, whether to skip.

<<Outline of Operation of Communication Terminal>>

Figure 2:
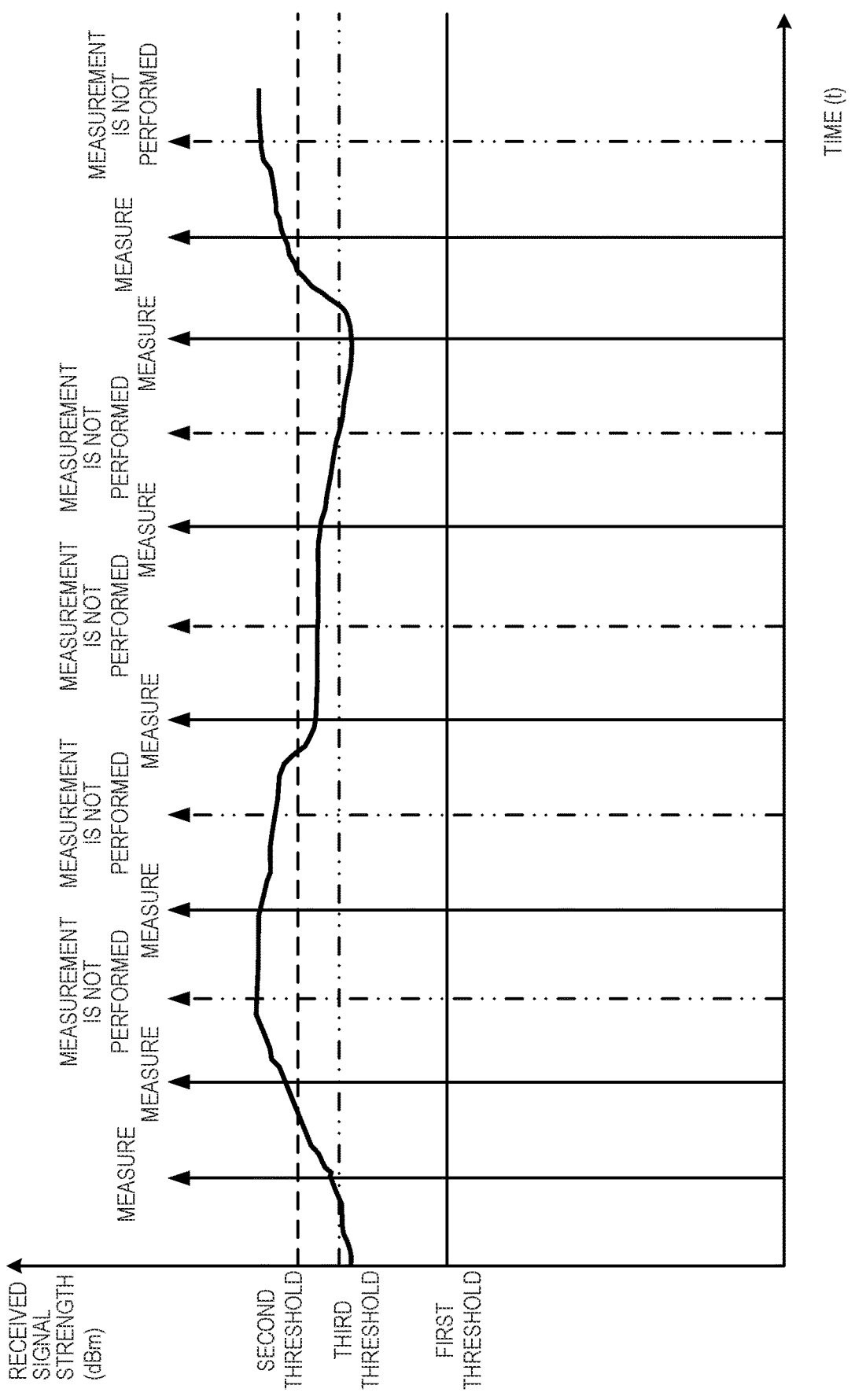
FIG. 2 is a view showing the operation of a communication terminal (remote UE) according to the second example embodiment of the present invention.

FIG. 2 is a view showing the operation of a communication terminal (remote UE) according to this example embodiment. In FIG. 2, the abscissa represents the elapse of time, and the ordinate represents the strength of the received signal (dB). In this example embodiment, a portable terminal compares the strength of the received signal with the second threshold and the third threshold while measuring the strength of the signal periodically transmitted from a relay station, thereby reducing the measurement count of the strength of the received signal.

In FIG. 2, a first threshold is a threshold used to reselect a relay station to be connected. When the measured received signal strength from the relay station under connection becomes smaller than the first threshold, it is determined that the communication state with the connected relay station has deteriorated, and processing of reselecting a relay station to be connected more stably is performed. The processing of reselection is not illustrated in FIG. 2.

In FIG. 2, the second threshold is a threshold used to stop measuring the strength of the received signal at the next period and reduce the measurement count in a case in which the strength of the received signal from the relay station is larger than the second threshold. In addition, the third threshold is a threshold used to cancel the stop of measuring the strength of the received signal and resume the measurement in a case in which the strength of the received signal from the relay station is smaller than the third threshold. Note that if the strength of the received signal from the relay station is smaller than the second threshold and larger than the third threshold, control is performed to maintain the state before the measurement.

As the result of control according to this example embodiment, sequentially from the left of FIG. 2, measurement (between the second threshold and the third threshold: the next measurement is not stopped), measurement (larger than the second threshold: the next measurement is stopped), stop, measurement (larger than the second threshold: the next measurement is stopped), stop, measurement (between the second threshold and the third threshold: the stop of the next measurement is maintained), stop, measurement (between the second threshold and the third threshold: the stop of the next measurement is maintained), stop, measurement (smaller than the third threshold: the next measurement is not stopped), measurement (larger than the second threshold: the next measurement is stopped), stop, . . . are performed. In this example embodiment, of the 12 received signal strength measurement periods, the measurement can be stopped at five periods because of the stably large measured strength, and the power consumption of the remote UE can be reduced.

<<Technical Premise>>

A technical premise concerning the measurement the strength of the received signal within the technical scope of this example embodiment will be described with reference to FIGS. 3A and 3B.

Figure 3B:
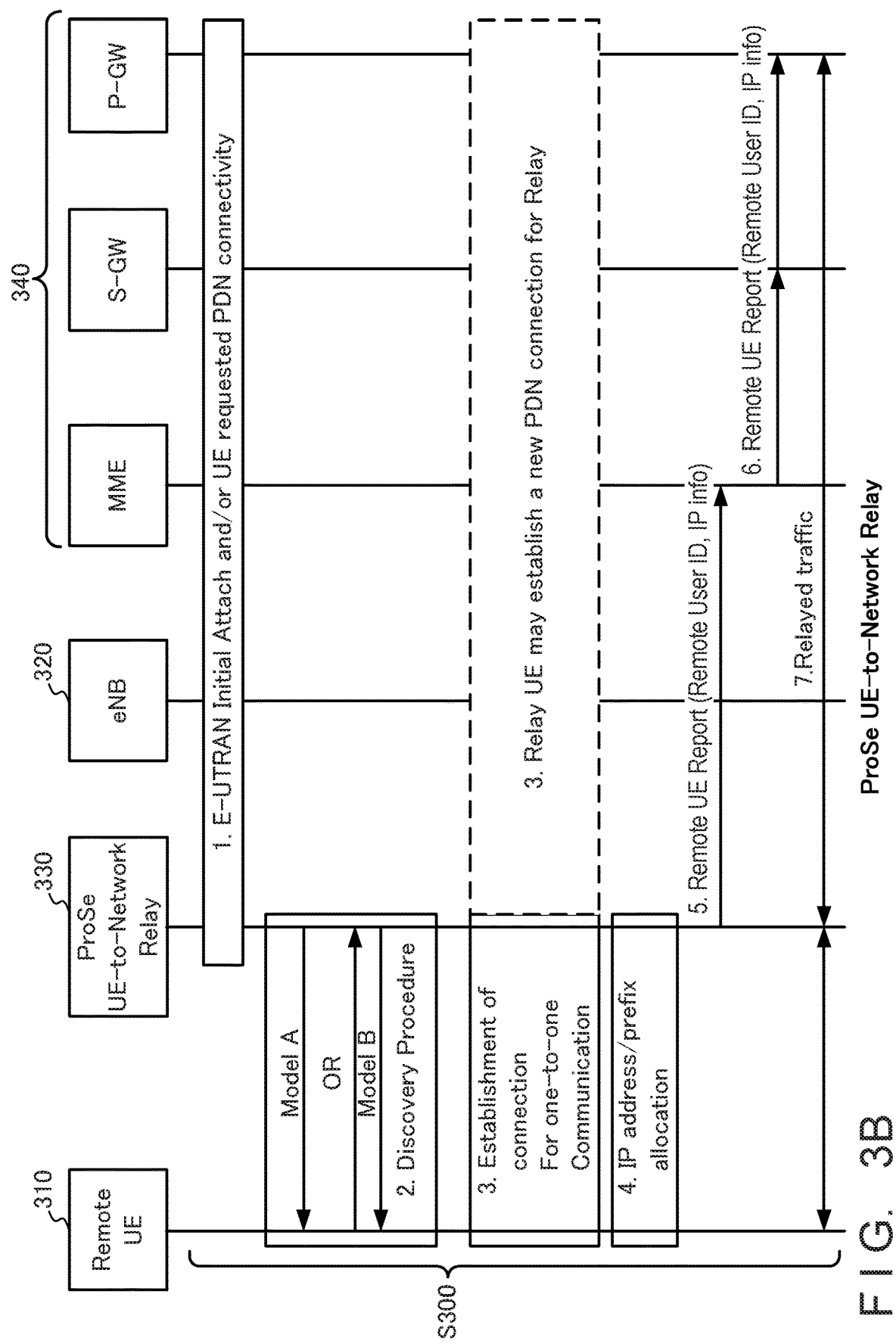
FIG. 3B is a sequence chart showing the standard operation of the communication processing system according to the technical premise.

FIG. 3A is a block diagram showing the standard arrangement of a communication processing system 300 according to a technical premise. FIG. 3A shows the architecture model of the communication processing system 300 shown in Figure 4.4.3-1 of "4.4.3 ProSe UE-to-Network Relay for Public Safety" of non-patent literature 1. In addition, FIG. 3B is a sequence chart showing the standard operation of the communication processing system 300 according to the technical premise. FIG. 3B shows a procedure of establishing ProSe (D2D) connection via UE-to-Network Relay shown in Figure 5.4.4.1-1 of "5.4.4 Direct communication via ProSe UE-to-Network Relay" of non-patent literature 1.

The outline of the connection establishment procedure (S300) of UE-to-Network Relay will be described below based on Figure 5.4.4.1-1. 1. A UE-to-Network Relay node attaches to E-UTRAN to establish PDN connection. 2. A remote UE searches for a UE-to-Network Relay node using the Model-A or Model-B discovery procedure. 3. The remote UE selects the UE-to-Network Relay node and establishes connection. 4. The UE-to-Network Relay node sets the IP address of the remote UE. 5. The UE-to-Network Relay node reports the remote UE ID and IP information to MME. 6. The MME reports the remote User ID and the IP information to S-GW and P-GW. 7. Relay traffic is transmitted/received between the remote UE and the P-GW.

Figure 5:
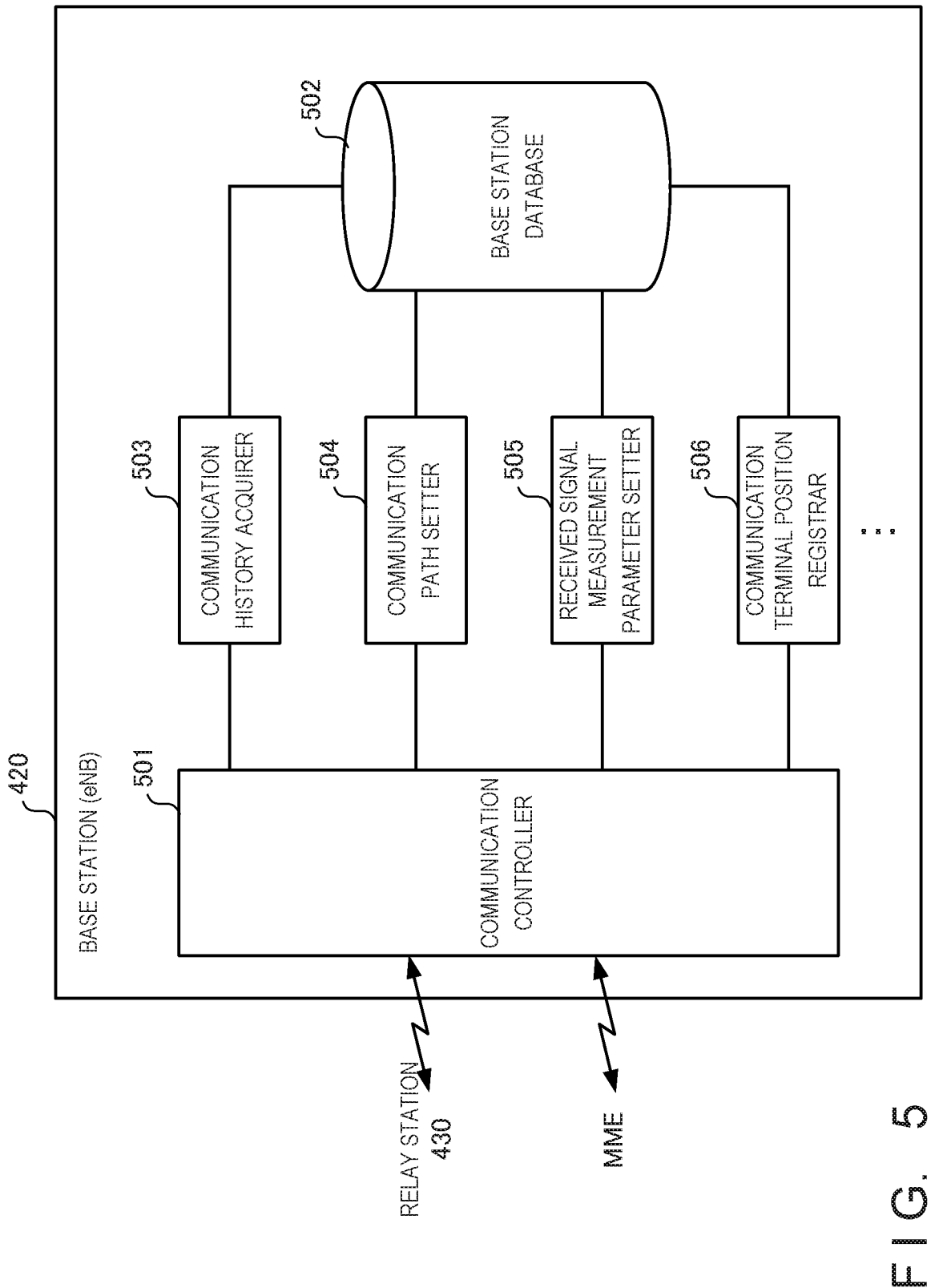
FIG. 5 is a block diagram showing the functional arrangement of a communication processing apparatus (base station: eNB) according to the second example embodiment of the present invention.

Note that the explanation of Figure 5.4.4.1-1 includes an account saying "even after the connection using the relay UE, to reselect a relay UE, the remote UE continuously measures the signal strength of the discovery message sent from the relay UE".

Additionally, "23.10.4 Sidelink Communication via ProSe UE-to-Network Relay" in non-patent literature 2 writes that "a remote UE selects the relay UE of the highest PC5 link quality, and if the signal strength of the PC5 link is less than a preset threshold, a relay UE reselection process is performed".

<<Problem of Technical Premise>>

Here, to prepare for reselection of a relay UE, the remote UE needs to measure the strength of the received signal of a discovery announcement message sent from the relay UE at a predetermined interval, and the power consumption of the remote UE increases. The influence is particularly large in an IoT/MTC/M2M device that operates by a battery and needs to guarantee an operation period of several to 10 years.

Technical Solution According to this Example Embodiment

In this example embodiment, to solve or alleviate the above-described problem, if the strength of the received signal is more than the second threshold higher than the first threshold set to reselect a relay UE, an operation in an intermittent measurement mode is performed, in which the next measurement is skipped and is not performed, and the measurement is performed in the next measurement opportunity. In addition, the third threshold that is higher than the first threshold but lower than the second threshold is set. If the strength of the received signal is less than the third threshold, an operation in a continuous measurement mode is performed, in which the measurement is continuously performed without skipping the measurement. The power consumption of the IoT device is thus reduced while maintaining the reliability of communication.

<<Operation of Communication Processing System>>

FIG. 4 is a sequence chart showing the operation of a communication processing system 400 according to this example embodiment. FIG. 4 shows constituent elements and a sequence associated with reduction of the measurement count of the strength of the received signal in a communication terminal 410 according to this example embodiment.

In step S410, a base station 420 sets the frequency of a transmission signal used to measure the strength of the received signal and the transmission/reception period of the transmission signal in the communication terminal 410 and a relay station 430, thereby setting the timing. Furthermore, the first threshold that is the determination criterion of reselection of the relay station 430 is set in the communication terminal 410.

Next, in step S300, the base station 420 selects, based on the measurement of the strength of the received signal, the relay station 430 to be connected to the communication terminal 410, as shown in FIG. 3B, and the communication terminal 410 and the base station 420 are connected via the selected relay station 430.

In step S420, the base station 420 acquires the second threshold and the third threshold according to this example embodiment and transmits them to the communication terminal 410. In step S430, the communication terminal 410 holds the transmitted second and third thresholds to be used to reduce the measurement count of the strength of the received signal and sets the thresholds.

After that, in step S440, the communication terminal 410 reduces the count of the measurement of the strength of the signal transmitted from the relay station 430 at the transmission/reception period of the transmission signal using the second threshold and the third threshold, thereby reducing the power consumption of the remote UE associated with the measurement of the strength of the received signal. Note that in this example embodiment, a case of "Model A" in which a Discovery Announcement Message is periodically transmitted from the relay station 430 will be described. However, "Model B" in which the communication terminal 410 requests a Discovery Response Message may be used.

<<Functional Arrangement of Communication Processing Apparatus>>

FIG. 5 is a block diagram showing the functional arrangement of the communication processing apparatus 420 (base station: eNB) according to this example embodiment. Note that FIG. 5 shows functional components associated with this example embodiment, and other functions provided in the communication processing apparatus 420 are not illustrated.

The communication processing apparatus 420 includes a communication controller 501, a base station database 502, a communication history acquirer 503, a communication path setter 504, a received signal measurement parameter setter 505, and a communication terminal position registrar 506.

The communication controller 501 controls communication between the communication processing apparatus 420 and the relay station 430 or a host device such as an MME. Note that although not illustrated in FIG. 5, the communication controller 501 may control communication between the communication processing apparatus 420 and the communication terminal 410. Additionally, in FIG. 5, one communication controller 501 controls communication with both the subordinate device and the host device. However, a subordinate device communication controller and a host device communication controller may separately be provided.

The base station database 502 stores data necessary for the operation of the communication processing apparatus 420 serving as a base station. The communication history acquirer 503 acquires the communication histories of the communication terminal 410 and the relay station 430, including the measurement result of the strength of the received signal measured by each communication terminal 410, and stores the communication history in the base station database 502. Based on the communication history information including the measurement result of the strength of the received signal stored in the base station database 502, the communication path setter 504 instructs to select and set the relay station 430 to be connected to the communication terminal 410. The received signal measurement parameter setter 505 refers to the base station database 502, and sets received signal measurement parameters in the communication terminal 410 or the relay station 430. The communication terminal position registrar 506 receives the position of the communication terminal 410 located in the cell of the base station, and registers the position in the host device such as an MME.

(Base Station Database)

Figure 6:
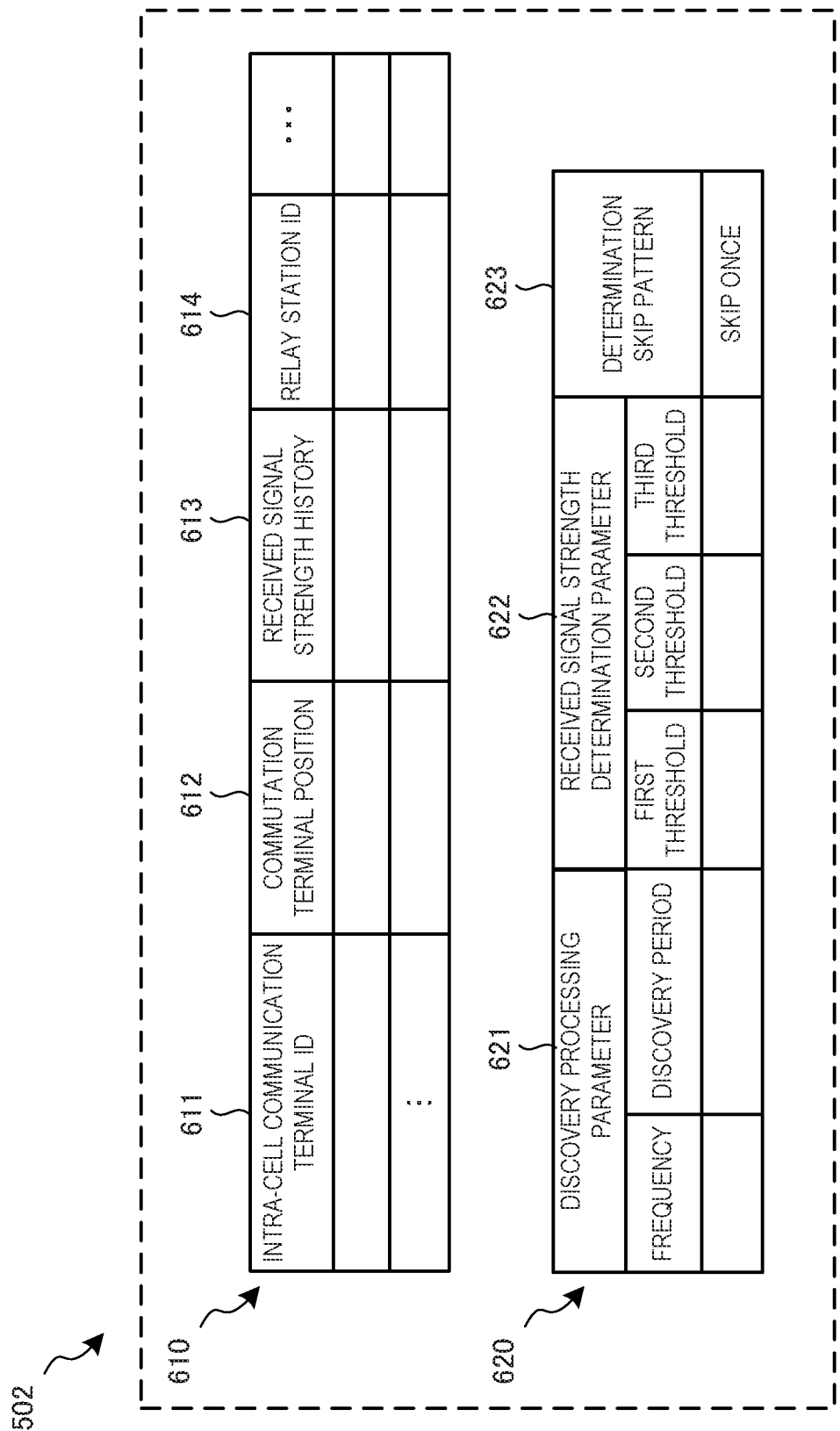
FIG. 6 is a view showing the arrangement of a base station database according to the second example embodiment of the present invention.

FIG. 6 is a view showing the arrangement of the base station database 502 according to this example embodiment. The base station database 502 stores data necessary for the operation of the communication processing apparatus 420 according to this example embodiment.

The base station database 502 includes a history storage portion 610 that stores the information histories of the communication terminal 410 and the relay station 430 in a cell controlled by the communication processing apparatus 420, and a parameter storage portion 620 that stores parameters used to implement control according to this example embodiment for the communication terminal 410 and the relay station 430 in the cell.

The history storage portion 610 stores a commutation terminal position 612, a received signal strength history 613 measured by the communication terminal 410, and a relay station ID 614 currently connected in response to a request, which are associated with a communication terminal ID 611 located in the cell.

The parameter storage portion 620 stores a discovery processing parameter 621 necessary for discovery processing, a received signal strength determination parameter 622 used to determine the strength of the received signal and perform measurement count reduction according to this example embodiment, and a measurement skip pattern 623. The discovery processing parameter 621 includes the frequency of a signal and a discovery period. The received signal strength determination parameter 622 includes the first threshold, the second threshold, and the third threshold. As the skip pattern 623, a pattern to skip the next one is stored in this example embodiment.

<<Functional Arrangement of Relay Station>>

Figure 7:
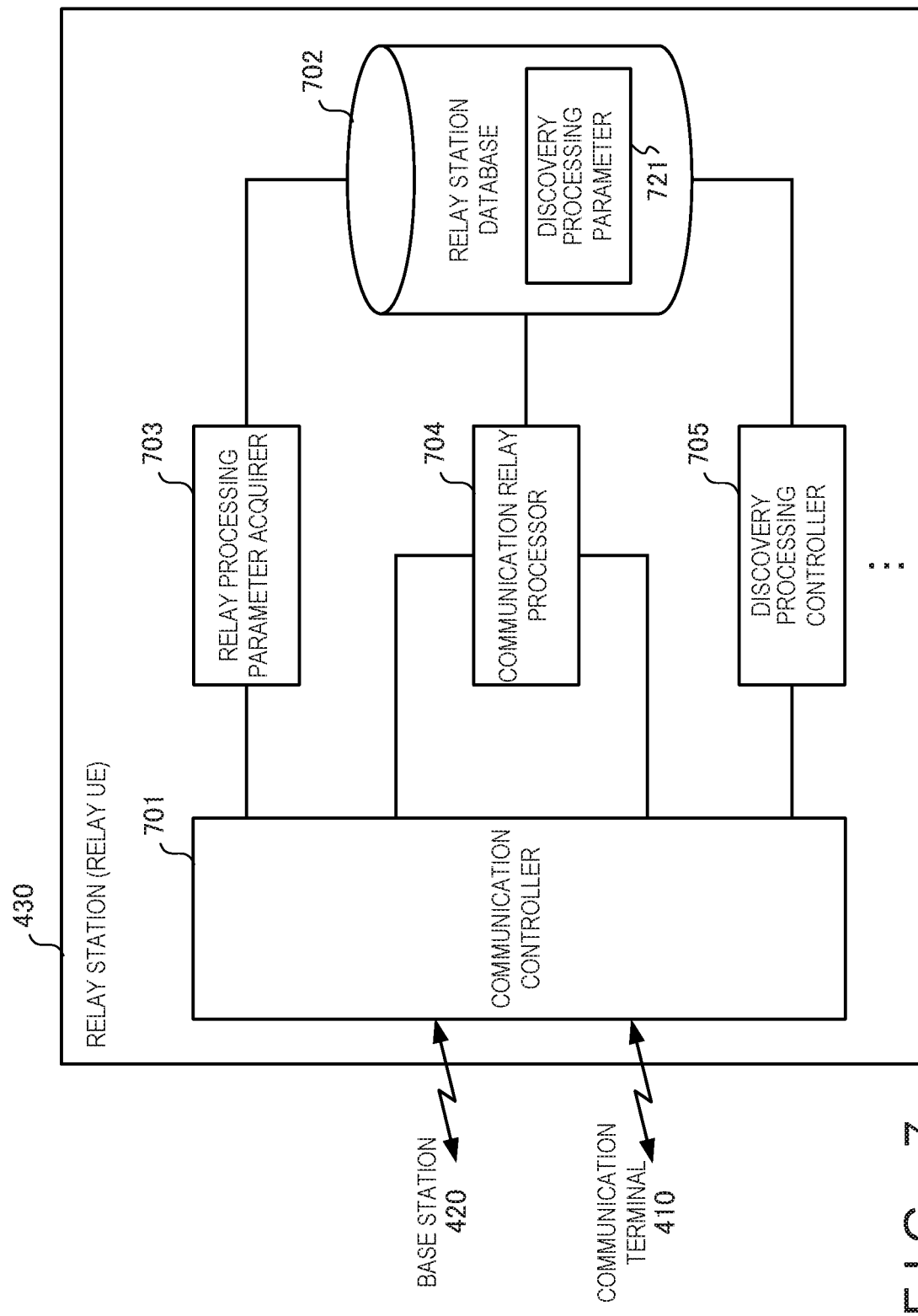
FIG. 7 is a block diagram showing the functional arrangement of a relay station (relay UE) according to the second example embodiment of the present invention.

FIG. 7 is a block diagram showing the functional arrangement of the relay station 430 (relay UE) according to this example embodiment. Note that FIG. 7 shows functional components associated with this example embodiment, and other functions provided in the relay station 430 are not illustrated.

The relay station 430 includes a communication controller 701, a relay station database 702, a relay processing parameter acquirer 703, a communication relay processor 704, and a discovery processing controller 705.

The communication controller 701 controls communication between the relay station 430 and the base station 420 or the communication terminal 410. Note that although not illustrated in FIG. 7, the communication controller 701 may control communication with another relay station 430. Additionally, in FIG. 7, one communication controller 701 controls communication with both the base station 420 and the communication terminal 410. However, a base station communication controller and a communication terminal communication controller may separately be provided.

The relay station database 702 includes a discovery processing parameter 721 and stores data necessary for the operation of the relay station 430. The relay processing parameter acquirer 703 acquires parameters necessary for relay processing set from the base station 420, and stores them in the relay station database 702. The communication relay processor 704 relays the communication between the base station 420 and the communication terminal 410 using the relay processing parameters stored in the relay station database 702. The discovery processing controller 705 controls discovery processing for the connected communication terminal 410 using parameters stored in the discovery processing parameter 721 of the relay station database 702.

<<Functional Arrangement of Communication Terminal>>

FIG. 8 is a block diagram showing the functional arrangement of the communication terminal 410 (remote UE) according to this example embodiment. Note that FIG. 8 shows functional components associated with this example embodiment, and other functions provided in the communication terminal 410 are not illustrated.

The communication terminal 410 includes a communication controller 801, a communication terminal database 802, a communication processing parameter acquirer 803, a communication processor 804, a received signal strength measurement processor 805, and a power supply (battery) 806.

The communication controller 801 controls communication between the communication terminal 410 and the relay station 430. Note that although not illustrated in FIG. 8, the communication controller 801 may control communication with the base station 420 or another communication terminal 410.

The communication terminal database 802 stores data necessary for the operation of the communication terminal 410. The communication processing parameter acquirer 803 acquires parameters necessary for communication processing set from the base station 420, and stores them in the communication terminal database 802. The communication processor 804 processes communication with the base station 420 via the relay station 430 using the communication processing parameters stored in the communication terminal database 802. Note that the communication processor 804 also performs reselection processing of a relay station based on the measurement result of the strength of the received signal. The received signal strength measurement processor 805 performs processing to reduce the measurement count of the strength of the received signal transmitted from the relay station 430 using the parameters stored in the communication terminal database 802. The power supply (battery) 806 is the power supply for the communication terminal 410.

(Communication Terminal Database)

Figure 9:
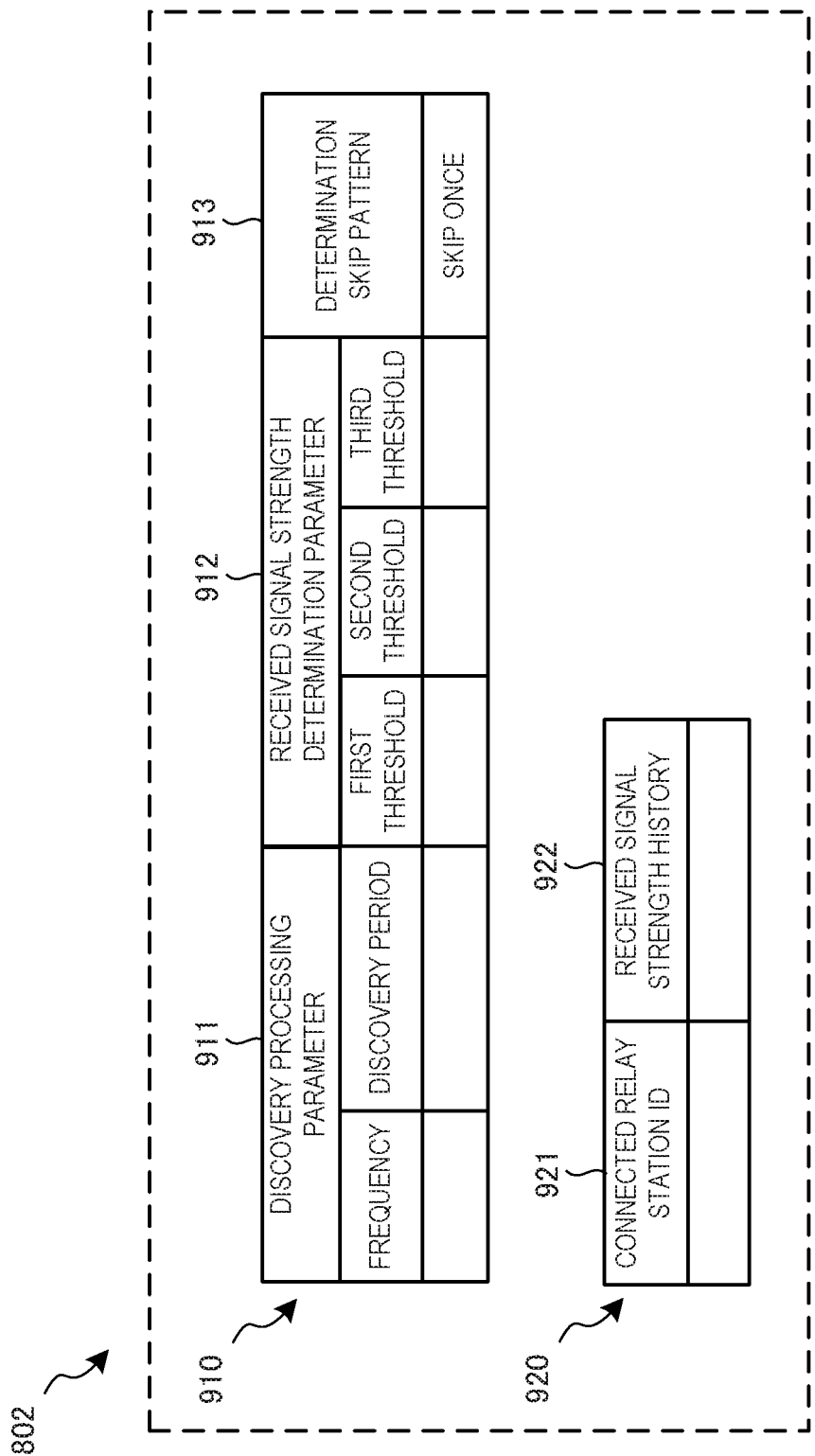
FIG. 9 is a view showing the arrangement of a communication terminal database according to the second example embodiment of the present invention.

FIG. 9 is a view showing the arrangement of the communication terminal database 802 according to this example embodiment. The communication terminal database 802 stores data necessary for the operation of the communication terminal 410.

The communication terminal database 802 includes a parameter storage portion 910 that stores parameters used to implement control according to this example embodiment for the communication terminal 410, and a relay station information storage portion 920 that stores the relay station 430 currently connected to the communication terminal 410, and a received signal strength history.

The parameter storage portion 910 stores a discovery processing parameter 911 necessary for discovery processing, a received signal strength determination parameter 912 used to determine the strength of the received signal and perform measurement count reduction according to this example embodiment, and a measurement skip pattern 913. The discovery processing parameter 911 includes the frequency of a signal and a discovery period. The received signal strength determination parameter 912 includes the first threshold, the second threshold, and the third threshold. As the skip pattern 913, a pattern to skip the next one is stored in this example embodiment.

The relay station information storage portion 920 stores a connected relay station ID 921 and a received signal strength history 922 measured by the communication terminal 410.

(Received Signal Strength Measurer)

Figure 10A:
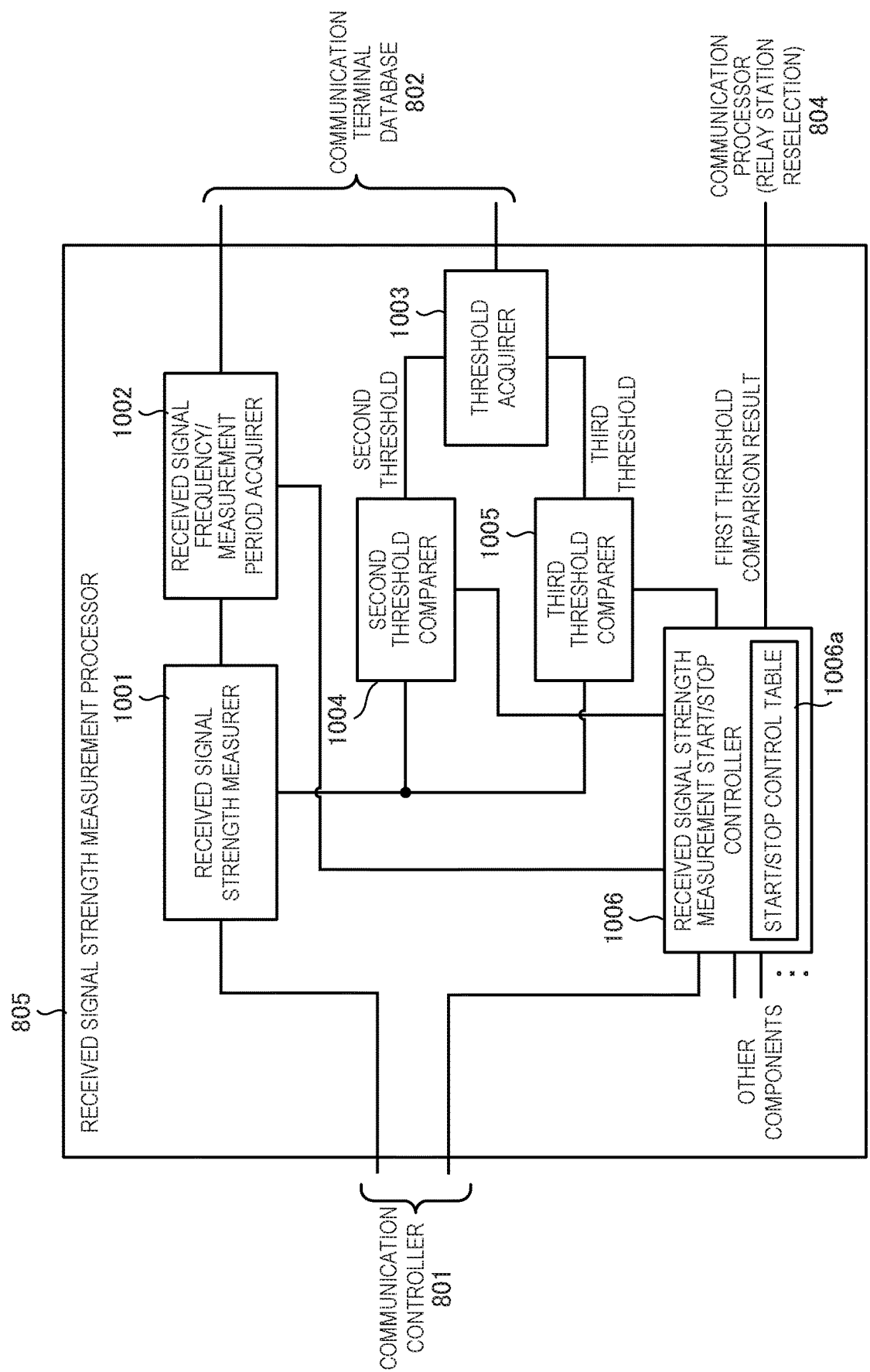
FIG. 10A is a block diagram showing the functional arrangement of a received signal strength measurement processor according to the second example embodiment of the present invention.

FIG. 10A is a block diagram showing the functional arrangement of the received signal strength measurement processor 805 according to this example embodiment.

The received signal strength measurement processor 805 includes a received signal strength measurer 1001, a received signal frequency/measurement period acquirer 1002, a threshold acquirer 1003, a second threshold comparer 1004, a third threshold comparer 1005, and a received signal strength measurement start/stop controller 1006.

The received signal strength measurer 1001 measures the strength of a received signal transmitted at a predetermined frequency from the relay station 430 at a predetermined period. The received signal frequency/measurement period acquirer 1002 acquires the frequency of the received signal and the measurement period stored in the communication terminal database 802, and provides them to the received signal strength measurer 1001.

The threshold acquirer 1003 acquires the second threshold and the third threshold stored in the communication terminal database 802. The second threshold comparer 1004 compares the strength of the received signal measured by the received signal strength measurer 1001 with the second threshold. The third threshold comparer 1005 compares the strength of the received signal measured by the received signal strength measurer 1001 with the third threshold.

The received signal strength measurement start/stop controller 1006 includes a start/stop control table 1006*a*. In a case of a comparison result in which the strength of the received signal from the communication processor 804 is larger than the first threshold, the received signal strength measurement start/stop controller 1006 controls, based on the comparison result of the second threshold comparer 1004 and the comparison result of the third threshold comparer 1005, whether to start or stop the next measurement of the strength of the received signal. Note that if the received signal strength measurement start/stop controller 1006 stops the next measurement of the strength of the received signal, the power is not supplied to the elements that constitute the received signal strength measurement processor 805, and the signal from the relay station 430 is neglected. The power consumption can largely be reduced by such power off associated with received signal strength measurement.

(Start/Stop Control Table)

FIG. 10B is a view showing the arrangement of the start/stop control table 1006*a* according to this example embodiment. The start/stop control table 1006*a* is used to control start/stop of received signal strength measurement in the received signal strength measurement start/stop controller 1006. Note that "H" in FIG. 10B represents a case in which the strength of the received signal is larger than the threshold, and "L" represents a case in which the strength of the received signal is smaller than the threshold. Note that a case in which the strength of the received signal is equal to the threshold may be included "H" or "L".

The start/stop control table 1006*a* stores measurement start/stop 1064 at a received signal strength measurement period in association with the combination of a first threshold comparison result 1061, a second threshold comparison result 1062, and a third threshold comparison result 1063.

That is, if the strength of the received signal is smaller than the first threshold, the measurement is stopped to reselect the relay station 430 independently of the comparison results of the second threshold and the third threshold. If the strength of the received signal is larger than the second threshold, the next measurement is stopped. If the strength of the received signal is between the second threshold and the third threshold, the preceding determination result is maintained. If the strength of the received signal is smaller than the third threshold, the next measurement is started.

<<Hardware Arrangement of Communication Processing Apparatus>>

Figure 11:
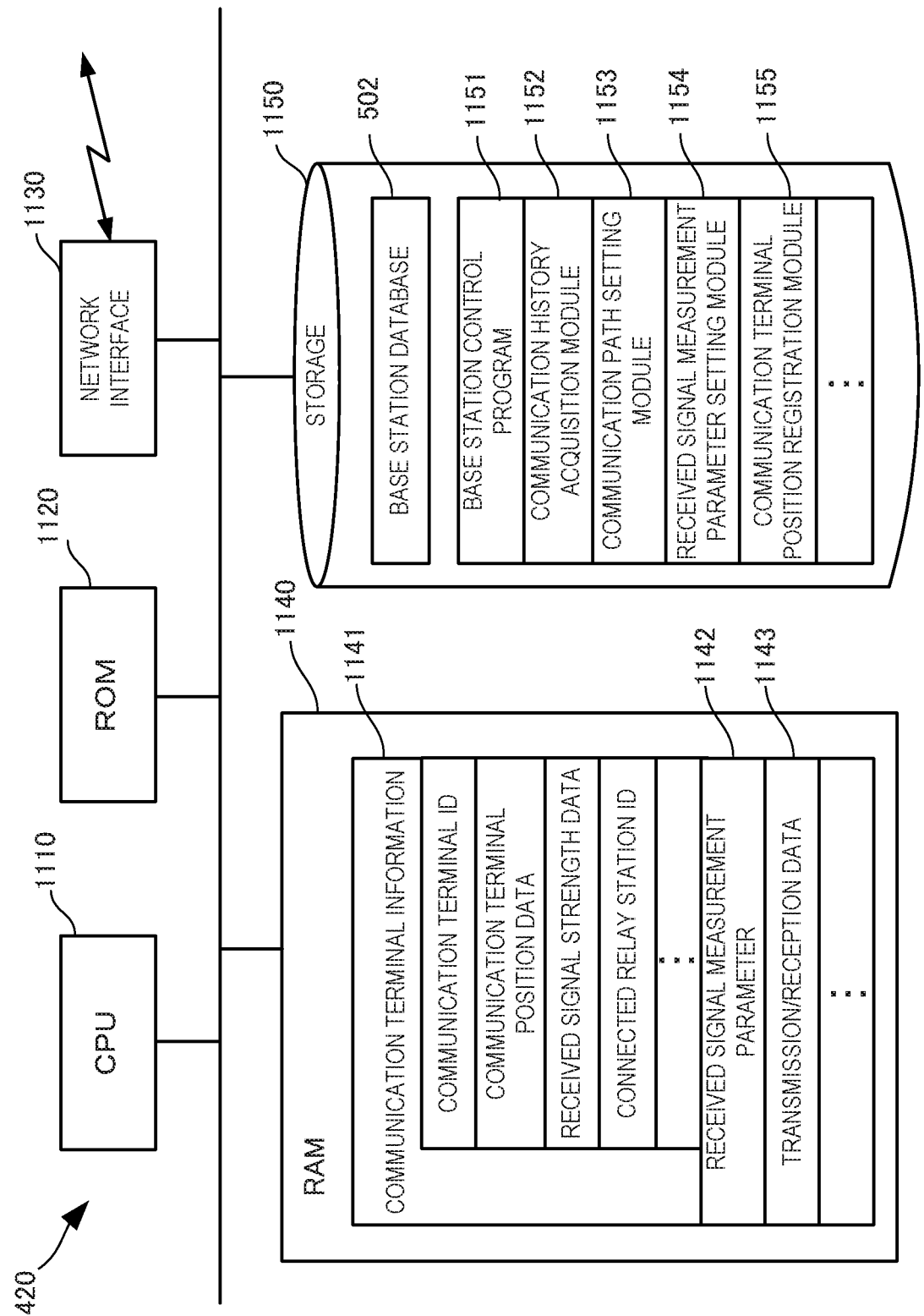
FIG. 11 is a block diagram showing the hardware arrangement of the communication processing apparatus (base station: eNB) according to the second example embodiment of the present invention.

FIG. 11 is a block diagram showing the hardware arrangement of the communication processing apparatus 420 (base station: eNB) according to this example embodiment.

In FIG. 11, a CPU (Central Processing Unit) 1110 is a processor for arithmetic control and executes a program, thereby implementing the functional components shown in FIG. 5. The CPU 1110 may include a plurality of processors and execute different programs, modules, tasks, threads, and the like in parallel. A ROM (Read Only Memory) 1120 stores initial data, the permanent data of programs, and the programs. A network interface 1130 controls communication with the relay station 430, the communication terminal 410, or another host device via a network.

A RAM (Random Access Memory) 1140 is a random access memory used by the CPU 1110 as a work area for temporary storage. In the RAM 1140, an area to store data necessary for implementation of this example embodiment is allocated. Communication terminal information 1141 is the information of a communication terminal located in the cell of the communication processing apparatus 420 serving as a base station. The communication terminal information 1141 includes communication terminal position data, received signal strength data, and a relay station ID under connection in association with the communication terminal ID of each communication terminal. A received signal measurement parameter 1142 is a parameter used to measure the strength of the received signal between the connected relay station 430 and the communication terminal 410. Transmission/reception data 1143 is data transmitted/received to/from the relay station 430, the communication terminal 410, or another host device via the network interface 1130.

A storage 1150 stores databases, various kinds of parameters, and following data and programs necessary for implementation of this example embodiment. The base station database 502 is the database shown in FIG. 6. The storage 1150 stores the following programs. A base station control program 1151 is a program that controls communication processing of the entire communication processing apparatus 420. A communication history acquisition module 1152 is a module that acquires communication history including the strength of the received signal from each of the communication terminal 410 and the relay station 430, and stores the history in the base station database 502. A communication path setting module 1153 is a module that selects the relay station 430 to be connected by referring to the communication history in the base station database 502, and sets the communication path between the base station and the communication terminal. A received signal measurement parameter setting module 1154 is a module configured to set parameters used to measure the strength of the received signal at a predetermined period and parameters including the thresholds used to control start/stop of received signal strength measurement. A communication terminal position registration module 1155 is a module configured to register the position of a communication terminal located in the cell.

Note that programs and data concerning general-purpose functions or other implementable functions of the communication processing apparatus 420 are not illustrated in the RAM 1140 and the storage 1150 shown in FIG. 11.

<<Processing Procedure of Communication Processing Apparatus>>

Figure 12:
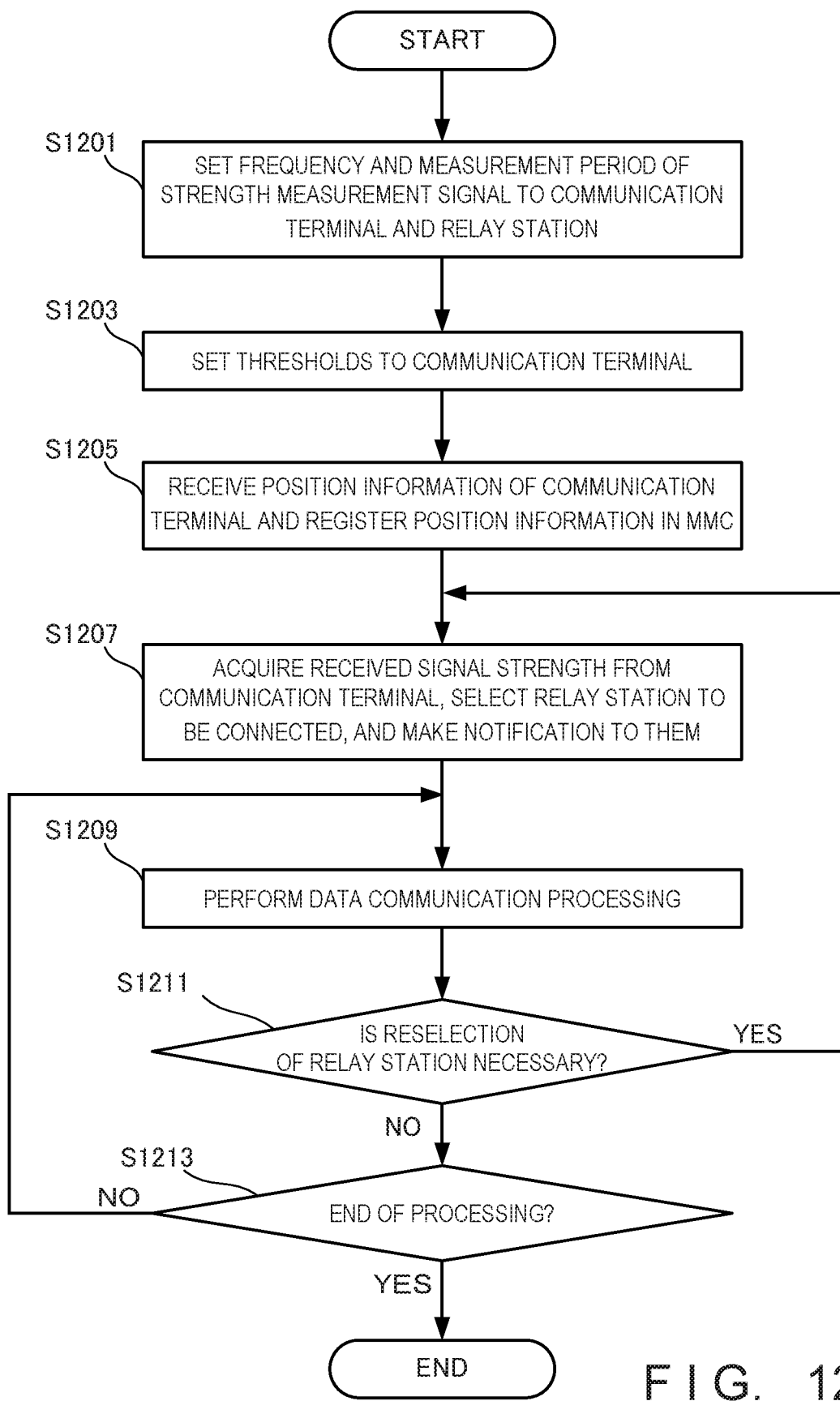
FIG. 12 is a flowchart showing the processing procedure of the communication processing apparatus (base station: eNB) according to the second example embodiment of the present invention.

FIG. 12 is a flowchart showing the processing procedure of the communication processing apparatus 420 (base station: eNB) according to this example embodiment. This flowchart is executed by the CPU 1110 shown in FIG. 11 using the RAM 1140 and implements the functional components shown in FIG. 5.

In step S1201, the communication processing apparatus 420 sets the frequency and the measurement period of the strength measurement signal to the communication terminal and the relay station. In step S1203, the communication processing apparatus 420 sets the thresholds to the communication terminal (in this example embodiment, the first threshold, the second threshold, and the third threshold). Additionally, in step S1205, the communication processing apparatus 420 receives the position information of the communication terminal and registers the position information in the MMC or the like.

In step S1207, the communication processing apparatus 420 acquires, from the communication terminal, the strength of the received signal received from each relay station, selects a relay station to be connected, and notifies the communication terminal and the selected relay station of it. In step S1209, the communication processing apparatus 420 executes data communication processing via the selected relay station.

In step S1211, if the strength of the received signal from the connected relay station is smaller than the first threshold, and the communication terminal requests reselection of a relay station, the communication processing apparatus 420 returns to step S1207 to reselect a relay station. If reselection of a relay station is not requested, in step S1213, the communication processing apparatus 420 determines whether to end the communication processing. If the communication processing is not be ended, the communication processing apparatus 420 returns to step S1209 to continue the data communication processing.

<<Hardware Arrangement of Communication Terminal>>

Figure 13:
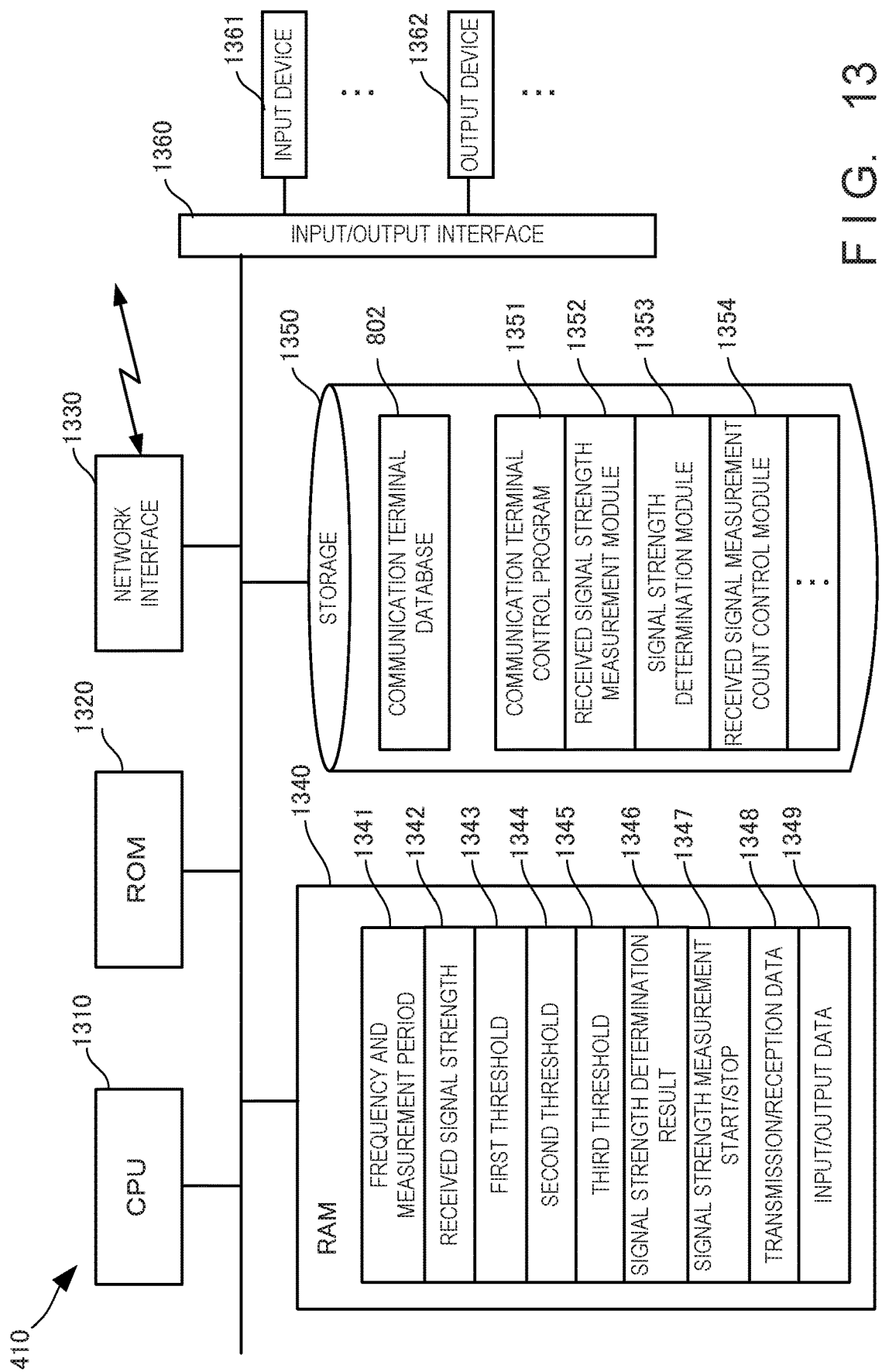
FIG. 13 is a block diagram showing the hardware arrangement of the communication terminal (remote UE) according to the second example embodiment of the present invention.

FIG. 13 is a block diagram showing the hardware arrangement of the communication terminal 410 (remote UE) according to this example embodiment.

In FIG. 13, a CPU 1310 is a processor for arithmetic control and executes a program, thereby implementing the functional components shown in FIG. 4. The CPU 1310 may include a plurality of processors and execute different programs, modules, tasks, threads, and the like in parallel. A ROM 1320 stores initial data, the permanent data of programs, and the programs. A network interface 1330 controls communication with the relay station 430 or the communication processing apparatus 420 via a network.

A RAM 1340 is a random access memory used by the CPU 1310 as a work area for temporary storage. In the RAM 1340, an area to store data necessary for implementation of this example embodiment is allocated. A frequency and measurement period 1341 includes the frequency of the strength measurement signal from the connected relay station and a measurement period. A received signal strength 1342 is the measured strength result of a signal received from the relay station based on the frequency and measurement period 1341. A first threshold 1343 is the threshold of the signal strength used to determine whether to reselect a relay station. A second threshold 1344 is the threshold of the signal strength used to determine whether to skip the next signal strength measurement. A third threshold 1345 is the threshold of the signal strength used to determine not to skip the next signal strength measurement. A signal strength determination result 1346 is a comparison result using the first threshold 1343, the second threshold 1344, and the third threshold 1345. A signal strength measurement start/stop 1347 is a flag representing whether to start/stop the next signal strength measurement based on the signal strength determination result 1346. Transmission/reception data 1348 is data transmitted/received to/from the relay station 430 or the base station 420 via the network interface 1330. Input/output data 1349 is data input/output to/from input and output devices via an input/output interface 1360.

A storage 1350 stores databases, various kinds of parameters, and following data and programs necessary for implementation of this example embodiment. The communication terminal database 802 stores data necessary for the operation of the communication terminal 410, as shown in FIG. 9. The storage 1350 stores the following programs. A communication terminal control program 1351 is a program configured to control the entire communication terminal 410. A received signal strength measurement module 1352 is a module that measures the reception strength of a signal from the relay station 430. A signal strength determination module 1353 is a module that compares the measured reception strength of the signal with a threshold and determines the signal strength. A received signal measurement count control module 1354 is a module that controls to reduce the measurement count of the strength of the received signal based on the determination result of the signal strength.

The input/output interface 1360 interfaces input/output to/from a peripheral device. An input device 1361 or an output device 1362 is connected to the input/output interface 1360 in a case in which the communication terminal 410 is used as an IoT device or the like. Note that another peripheral device may be connected.

Note that programs and data concerning general-purpose functions or other implementable functions of the communication terminal 410 are not illustrated in the RAM 1340 and the storage 1350 shown in FIG. 13.

<<Processing Procedure of Communication Terminal>>

Figure 14B:
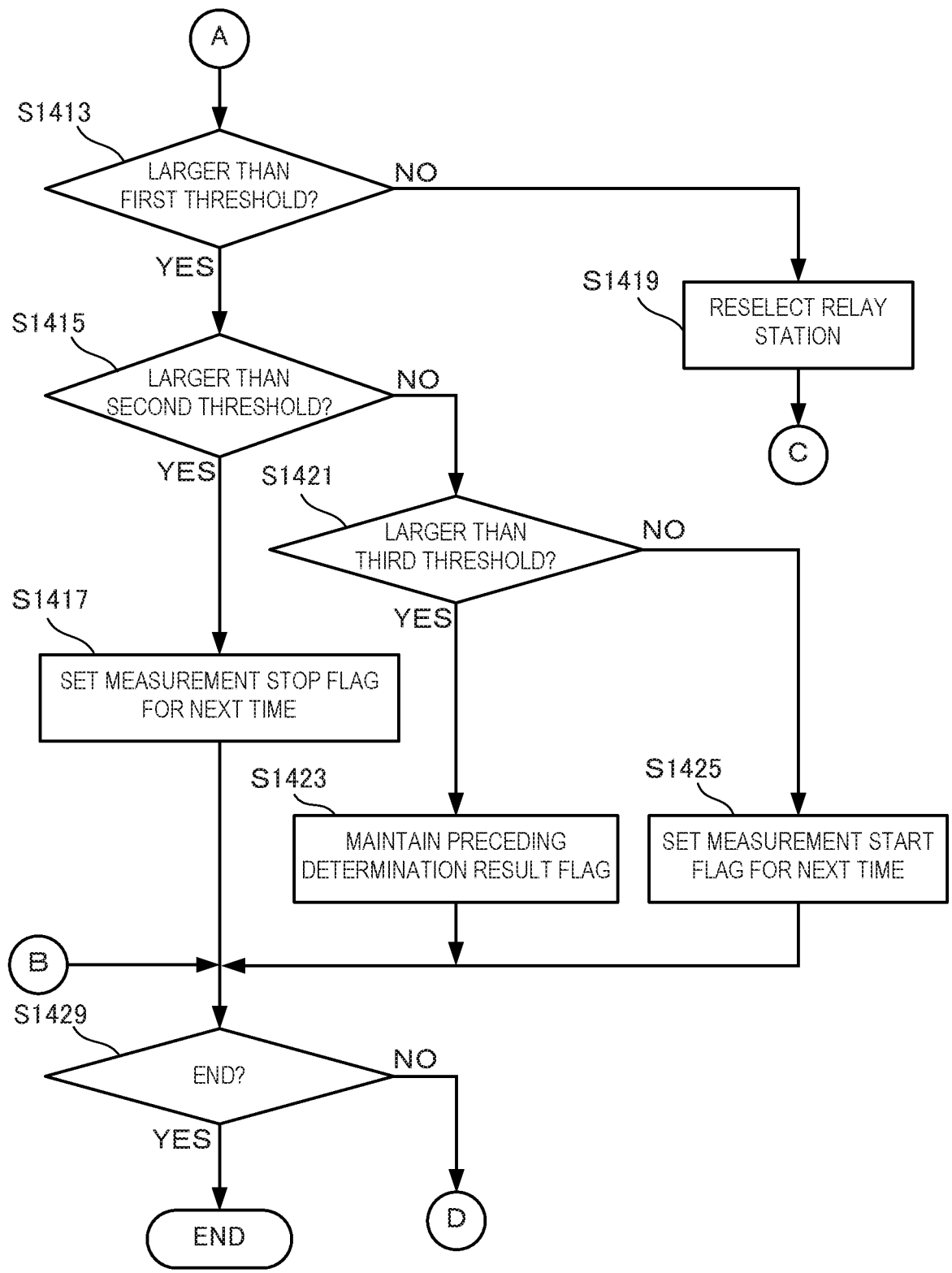
FIG. 14B is a flowchart showing the processing procedure of the communication terminal (remote UE) according to the second example embodiment of the present invention.

FIGS. 14A and 14B are flowcharts showing the processing procedure of the communication terminal 410 (remote UE) according to this example embodiment. These flowcharts are executed by the CPU 1310 shown in FIG. 13 using the RAM 1340 and implements the functional components shown in FIG. 8.

In step S1401, the communication terminal 410 receives the frequency and the measurement period of the strength measurement signal from the base station 420. Additionally, in step S1403, the communication terminal 410 receives thresholds from the base station 420. In this example, the first threshold, the second threshold, and the third threshold are received. In step S1405, the communication terminal 410 acquires position information and transmits it to the base station 420 to register the position.

In step S1407, the communication terminal 410 waits for the measurement timing of the strength of the received signal in accordance with the received measurement period. At the measurement timing, in step S1409, the communication terminal 410 determines whether to start/stop the signal strength measurement. To start the signal strength measurement, in step S1411, the communication terminal 410 executes signal strength measurement processing. To stop the signal strength measurement, in step S1427, the communication terminal 410 changes the stop flag to the start flag, and advances to step S1429.

After the execution of the signal strength measurement processing, in step S1413, the communication terminal 410 determines whether the measured signal strength is larger than the first threshold. If the signal strength is smaller than the first threshold, in step S1419, the communication terminal 410 reselects a relay station, and returns to step S1401.

If the signal strength is larger than the first threshold, in step S1415, the communication terminal 410 determines whether the measured signal strength is larger than the second threshold. If the signal strength is larger than the second threshold, in step S1417, the communication terminal 410 sets the measurement stop flag for the next time. If the signal strength is smaller than the second threshold, in step S1421, the communication terminal 410 determines whether the measured signal strength is larger than the third threshold. If the signal strength is larger than the third threshold, in step S1423, the communication terminal 410 maintains the flag of the preceding determination result. That is, for skip, skip in every other time is continued. For continuous measurement, continuous measurement is continued. If the signal strength is smaller than the third threshold, in step S1425, the communication terminal 410 sets the measurement start flag for the next time.

In step S1429, the communication terminal 410 determines whether to end the communication. If the communication is not be ended, the process returns to step S1407 to wait for the next signal strength measurement period.

According to this example embodiment, it is possible to more stably reduce the measurement count of the strength of the received signal while maintaining the reliability of communication and reduce the power consumption of the remote UE associated with the measurement of the strength of the received signal.

Third Example Embodiment

A communication processing system according to the third example embodiment of the present invention will be described next. The communication processing system according to this example embodiment is different from the second example embodiment in that the measurement count of the strength of the received signal is reduced not by performing skip only once but by performing skip a plurality of times if the strength of the received signal is stable. The rest of the components and operations is the same as in the second example embodiment. Hence, the same reference numerals denote the same components and operations, and a detailed description thereof will be omitted.

<<Outline of Operation of Communication Terminal>>

Figure 15:
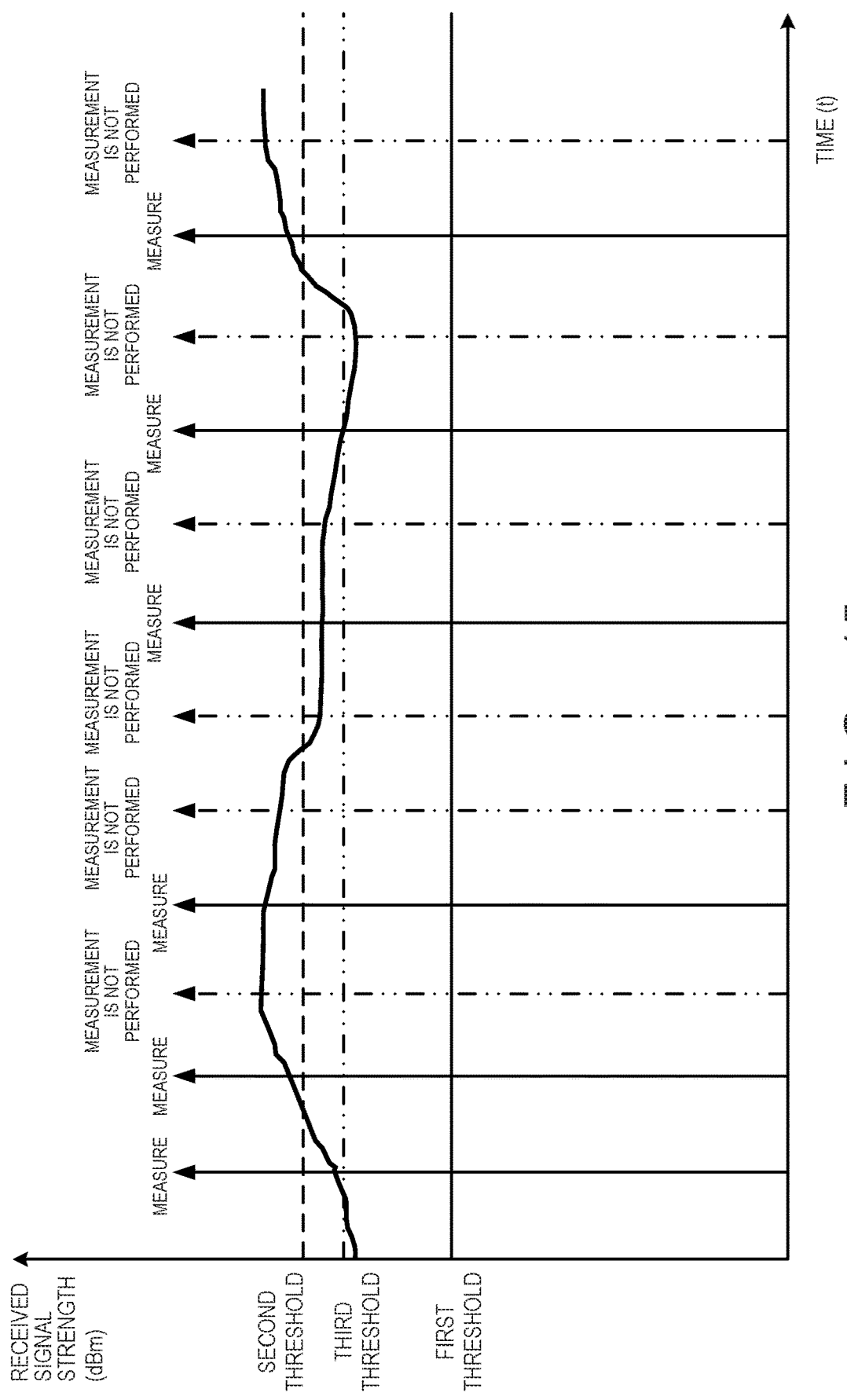
FIG. 15 is a view showing the operation of a communication terminal (remote UE) according to the third example embodiment of the present invention.

FIG. 15 is a view showing the operation of a communication terminal (remote UE) according to this example embodiment. In FIG. 15, if the strength of the received signal is larger than the second threshold in two continuous measurements, the next two measurements are skipped. Furthermore, the number of skips may be made to correspond to the continuation count of the case in which the strength of the received signal is larger than the second threshold. Note that determination by comparison with each threshold is the same as in the second example embodiment.

As the result of control according to this example embodiment, sequentially from the left of FIG. 15, measurement (between the second threshold and the third threshold: the next measurement is not stopped), measurement (larger than the second threshold: the next measurement is stopped), stop, measurement (larger than the second threshold: the next two measurements are stopped), stop, stop, measurement (between the second threshold and the third threshold: the stop of the next measurement is maintained), stop, measurement (between the second threshold and the third threshold: the stop of the next measurement is maintained), stop, measurement (smaller than the third threshold: the next measurement is not stopped), measurement (larger than the second threshold: the next measurement is stopped), stop, . . . are performed. In this example embodiment, of the 12 received signal strength measurement periods, the measurement can be stopped at six periods because of the stably large measured strength, and the power consumption of the remote UE can further be reduced.

(Start/Stop Control Table)

Figure 16:
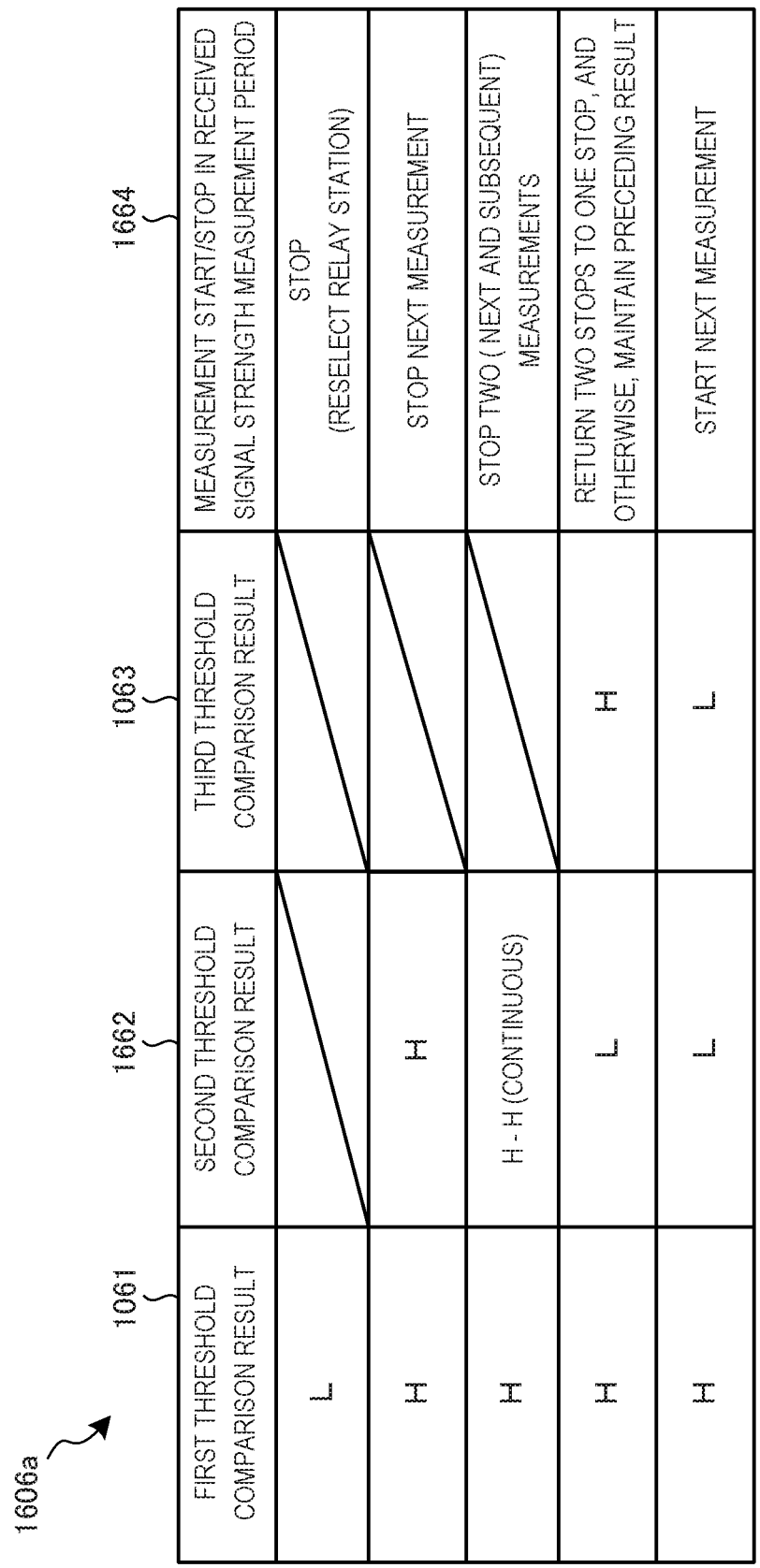
FIG. 16 is a view showing the arrangement of a start/stop control table according to the third example embodiment of the present invention.

FIG. 16 is a view showing the arrangement of a start/stop control table 1606*a* according to this example embodiment. Note that the same reference numerals as in FIG. 10B denote the same elements in FIG. 16, and a repetitive description thereof will be omitted.

The start/stop control table 1606*a* stores measurement start/stop 1664 at a received signal strength measurement period in association with the combination of a first threshold comparison result 1061, a second threshold comparison result 1662, and a third threshold comparison result 1063.

That is, if the strength of the received signal is continuously larger than the second threshold, the next two measurements are stopped. If the strength of the received signal is between the second threshold and the third threshold, in a case of stop of two measurements, the number of stops is returned to one. Otherwise, the preceding determination result is maintained.

<<Processing Procedure of Communication Terminal>>

Figure 17:
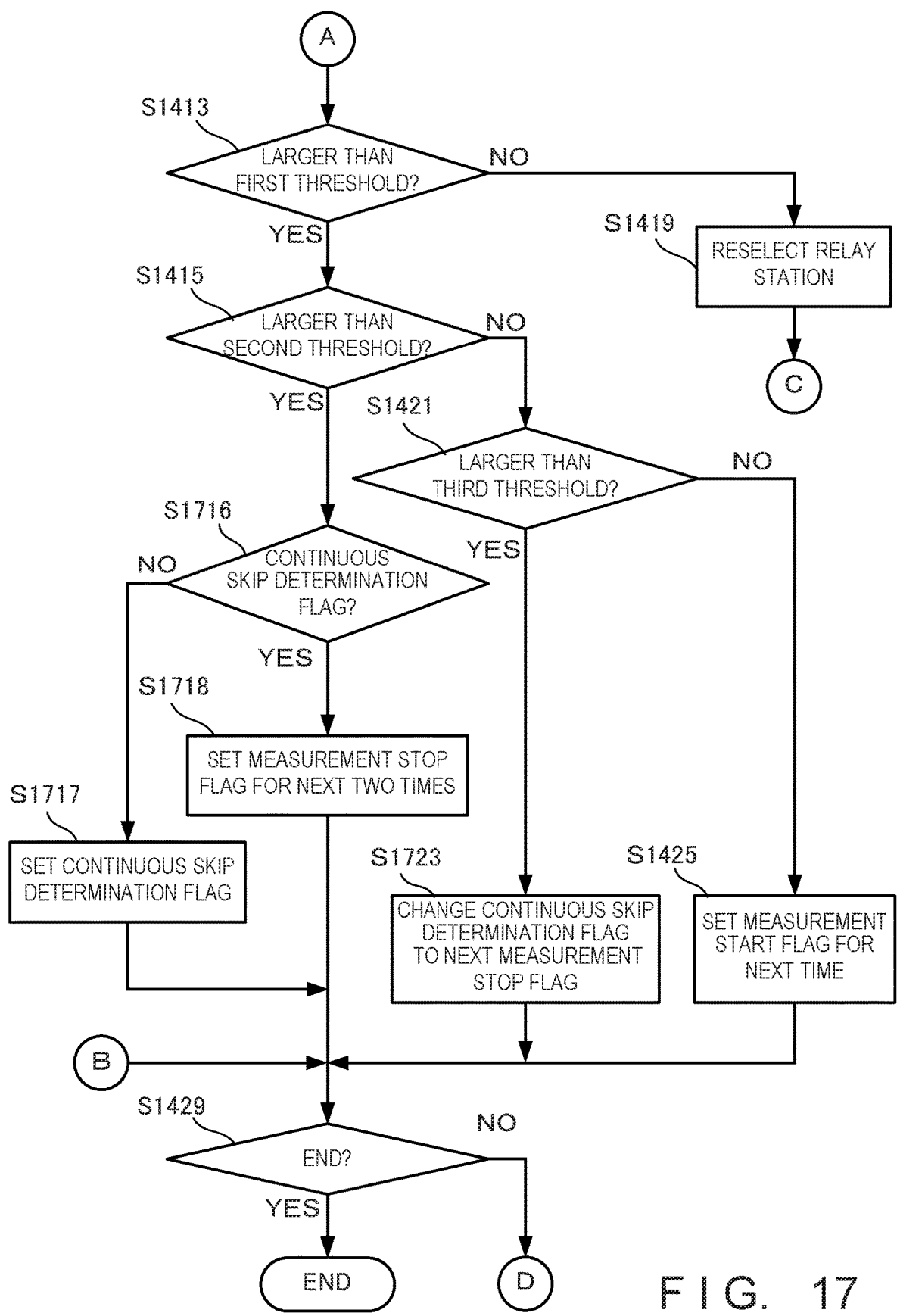
FIG. 17 is a flowchart showing the processing procedure of the communication terminal (remote UE) according to the third example embodiment of the present invention.

FIG. 17 is a flowchart showing the processing procedure of a communication terminal 410 (remote UE) according to this example embodiment. Note that the same step numbers as in FIG. 14B denote the same steps in FIG. 17, and a repetitive description thereof will be omitted.

In step S1716, the communication terminal 410 determines whether a continuous skip determination flag is set. If the continuous skip determination flag is not set, in step S1717, the communication terminal 410 sets the continuous skip determination flag. On the other hand, if the continuous skip determination flag is set, in step S1718, the communication terminal 410 sets a continuous measurement stop flag for the next two times.

In addition, if the measured received signal strength is between the second threshold and the third threshold, in step S1723, the communication terminal 410 changes the continuous skip determination flag to the next measurement stop flag.

According to this example embodiment, if the strength of the received signal is stable, it is possible to further reduce the measurement count and reduce the power consumption of the remote UE associated with the measurement of the strength of the received signal.

Fourth Example Embodiment

A communication processing system according to the fourth example embodiment of the present invention will be described next. The communication processing system according to this example embodiment is different from the second example embodiment and the third example embodiment in that the thresholds used to control the measurement count of the strength of the received signal are updated in correspondence with the stability of the strength of the received signal. The rest of the components and operations is the same as in the second example embodiment or the third example embodiment. Hence, the same reference numerals denote the same components and operations, and a detailed description thereof will be omitted.

<<Outline of Operation of Communication Terminal>>

FIG. 18 is a view showing the operation of a communication terminal (remote UE) according to this example embodiment. In FIG. 18, if the strength of the received signal is larger than the second threshold in two continuous measurements, at least one of the second threshold and the third threshold is updated. In the example shown in FIG. 18, the second threshold and the third threshold are changed to smaller values. Note that determination by comparison with each threshold is the same as in the second example embodiment.

As the result of control according to this example embodiment, sequentially from the left of FIG. 18, measurement (between the second threshold and the third threshold: the next measurement is not stopped), measurement (larger than the second threshold: the next measurement is stopped), stop, measurement (larger than the second threshold: the next measurement is stopped+the second threshold and the third threshold are changes to smaller values), stop, measurement (larger than the second threshold: the next measurement is stopped), stop, measurement (between the second threshold and the third threshold: the stop of the next measurement is maintained), stop, measurement (between the second threshold and the third threshold: the stop of the next measurement is maintained), stop, measurement (larger than the second threshold: the next measurement is stopped), . . . are performed. In this example embodiment, of the 12 received signal strength measurement periods, the measurement can be stopped at five periods because of the stable measured strength, and the power consumption of the remote UE can be reduced.

(Base Station Database)

Figure 19A:
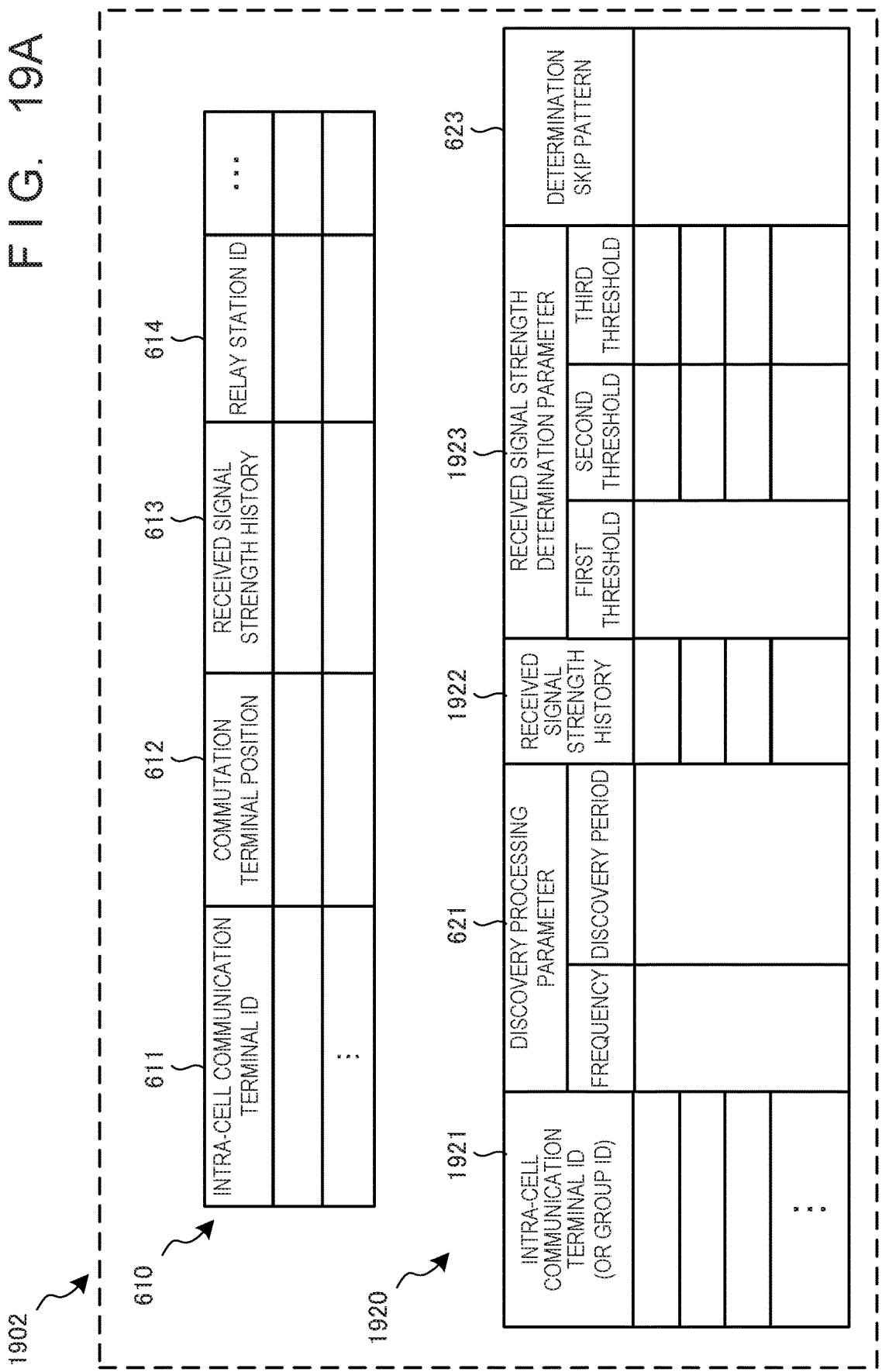
FIG. 19A is a view showing the arrangement of a base station database according to the fourth example embodiment of the present invention.

FIG. 19A is a view showing the arrangement of a base station database 1902 according to this example embodiment. Note that the same reference numerals as in FIG. 6 denote the same functional components in FIG. 19A, and a repetitive description thereof will be omitted.

The base station database 1902 includes a history storage portion 610 that stores the information histories of a communication terminal 410 and a relay station 430 in a cell controlled by a communication processing apparatus 420, and a parameter storage portion 1920 that stores parameters used to implement control according to this example embodiment for the communication terminal 410 and the relay station 430 in the cell.

The parameter storage portion 1920 stores a received signal strength history 1922 and a different second threshold or third threshold as a received signal strength determination parameter 1923 in association with each intra-cell communication terminal ID 1921 (or group ID).

<<Processing Procedure of Communication Processing Apparatus>>

Figure 19B:
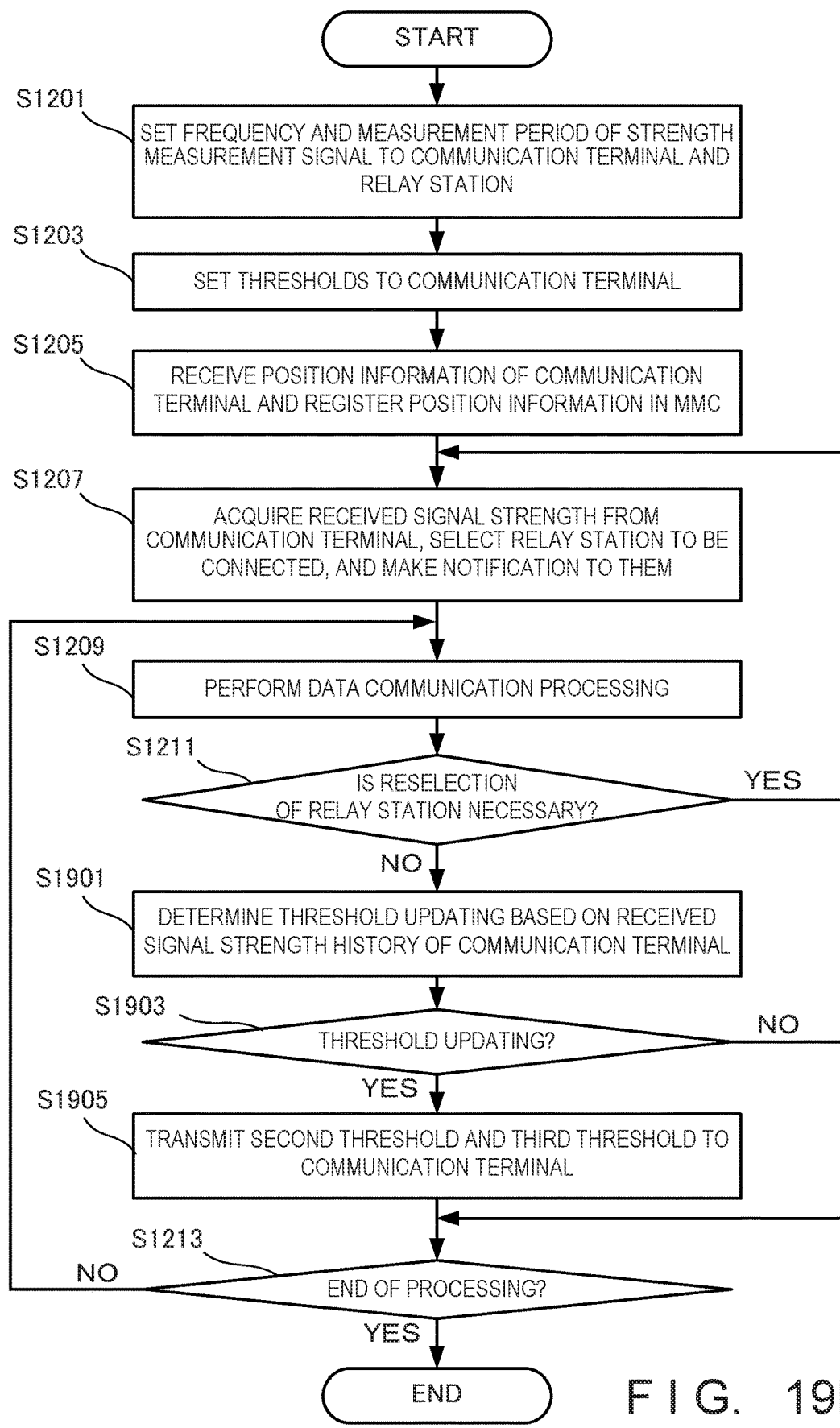
FIG. 19B is a flowchart showing the processing procedure of a communication processing apparatus (base station: eNB) according to the fourth example embodiment of the present invention.

FIG. 19B is a flowchart showing the processing procedure of the communication processing apparatus 420 (base station: eNB) according to this example embodiment. Note that the same step numbers as in FIG. 12 denote the same steps in FIG. 19B, and a repetitive description thereof will be omitted.

In step S1901, the communication processing apparatus 420 determines, based on the received signal strength history of the communication terminal, whether the thresholds need to be updated. If the thresholds need to be updated, the communication processing apparatus 420 advances from step S1903 to step S1905 to transmit the second threshold and the third threshold to be updated to the communication terminal. If the thresholds need not be updated, the communication processing apparatus 420 advances to step S1213 without doing anything.

<<Processing Procedure of Communication Terminal>>

Figure 20:
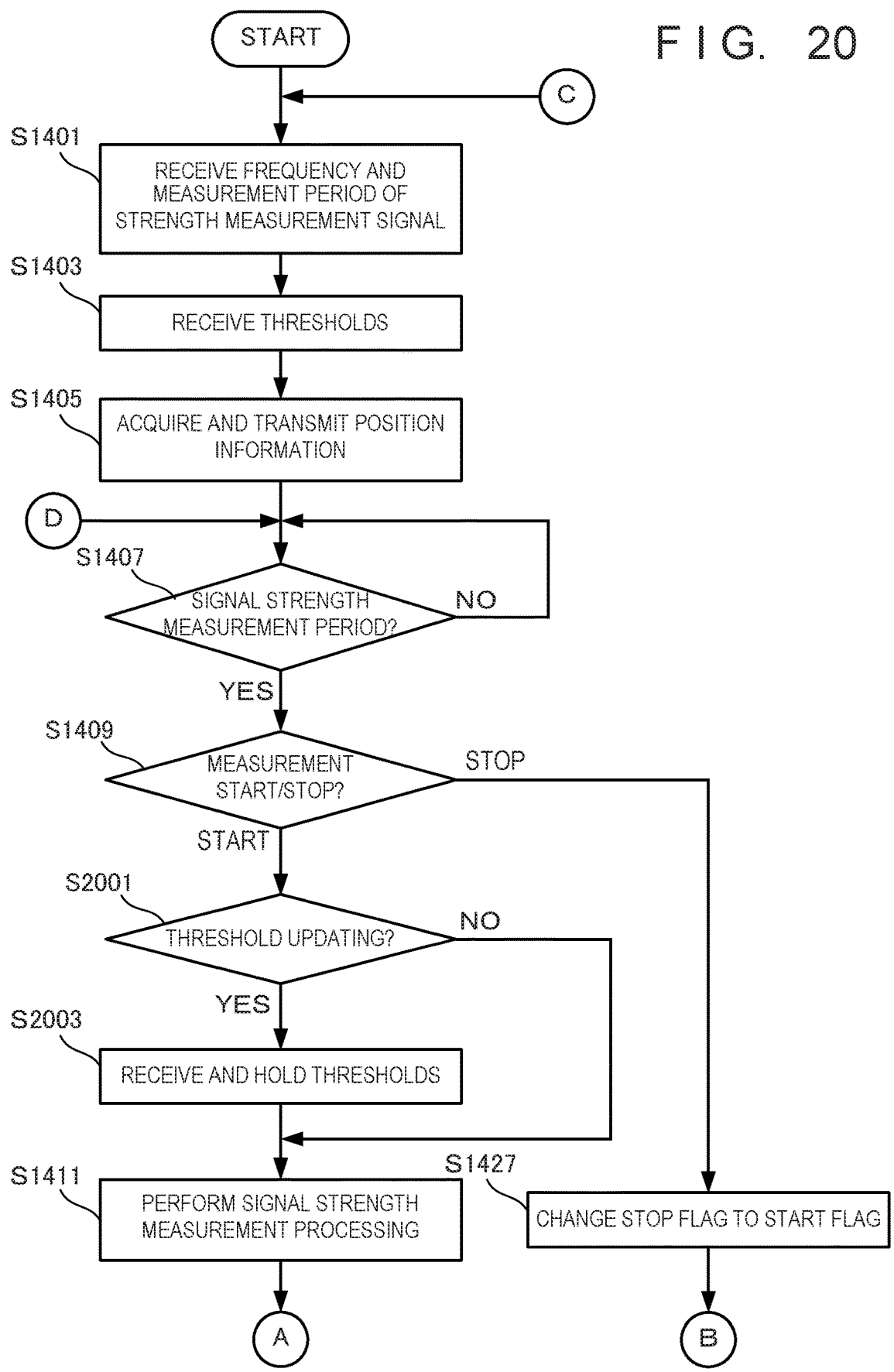
FIG. 20 is a flowchart showing the processing procedure of the communication terminal (remote UE) according to the fourth example embodiment of the present invention.

FIG. 20 is a flowchart showing the processing procedure of the communication terminal 410 (remote UE) according to this example embodiment. Note that the same step numbers as in FIG. 14A denote the same steps in FIG. 20, and a repetitive description thereof will be omitted.

In step S2001, the communication terminal 410 determines whether a threshold updating instruction is present. If the threshold updating instruction is present, in step S2003, the communication terminal 410 receives and holds new thresholds. On the other hand, if the threshold updating instruction is not present, the communication terminal 410 advances to step S1411 without doing anything.

According to this example embodiment, it is possible to perform reduction of the measurement count on which the stability of the strength of the received signal is reflected and reduce the power consumption of the remote UE associated with the measurement of the strength of the received signal.

Fifth Example Embodiment

A communication processing system according to the fifth example embodiment of the present invention will be described next. The communication processing system according to this example embodiment is different from the second to fourth example embodiments in that the measurement count of the strength of the received signal is controlled in consideration of the state of the communication terminal. The rest of the components and operations is the same as in the second to fourth example embodiments. Hence, the same reference numerals denote the same components and operations, and a detailed description thereof will be omitted.

<<Outline of Operation of Communication Terminal>>

FIG. 21 is a view showing the operation of a communication terminal (remote UE) according to this example embodiment. In FIG. 21, the current state of the communication terminal is determined, and the measurement of the strength of the received signal is controlled in correspondence with the state. In the example shown in FIG. 21, during the period immediately after connection to the relay station or during the movement of the communication terminal, skip of signal strength measurement is suppressed because the strength of the received signal is unstable. On the other hand, if the period is not the period immediately after connection to the relay station, and the communication terminal is not moving, skip of signal strength measurement is performed because the strength of the received signal is stable. Note that determination by comparison with each threshold is the same as in the second example embodiment.

As the result of control according to this example embodiment, sequentially from the left of FIG. 21, measurement (between the second threshold and the third threshold: immediately after connection: the next measurement is not stopped), measurement (larger than the second threshold, but the communication terminal is moving: the next measurement is not stopped), measurement (larger than the second threshold, but the communication terminal is moving: the next measurement is not stopped), measurement (larger than the second threshold, but the communication terminal is moving: the next measurement is not stopped), measurement (larger than the second threshold, and the communication terminal is at rest: the next measurement is stopped), stop, measurement (between the second threshold and the third threshold, and the communication terminal is at rest: the next measurement is stopped), stop, measurement (between the second threshold and the third threshold, and the communication terminal is moving: the next measurement is not stopped), measurement (smaller than the third threshold, and the communication terminal is moving: the next measurement is not stopped), measurement (larger than the second threshold, but the communication terminal is moving: the next measurement is not stopped), measurement (larger than the second threshold, but the communication terminal is moving: the next measurement is not stopped), . . . are performed. In this example embodiment, of the 12 received signal strength measurement periods, the measurement is stopped at two periods because of the stable measured strength. However, the stop is suppressed during the movement of the communication terminal because the measured strength is unstable.

(Base Station Database)

Figure 22A:
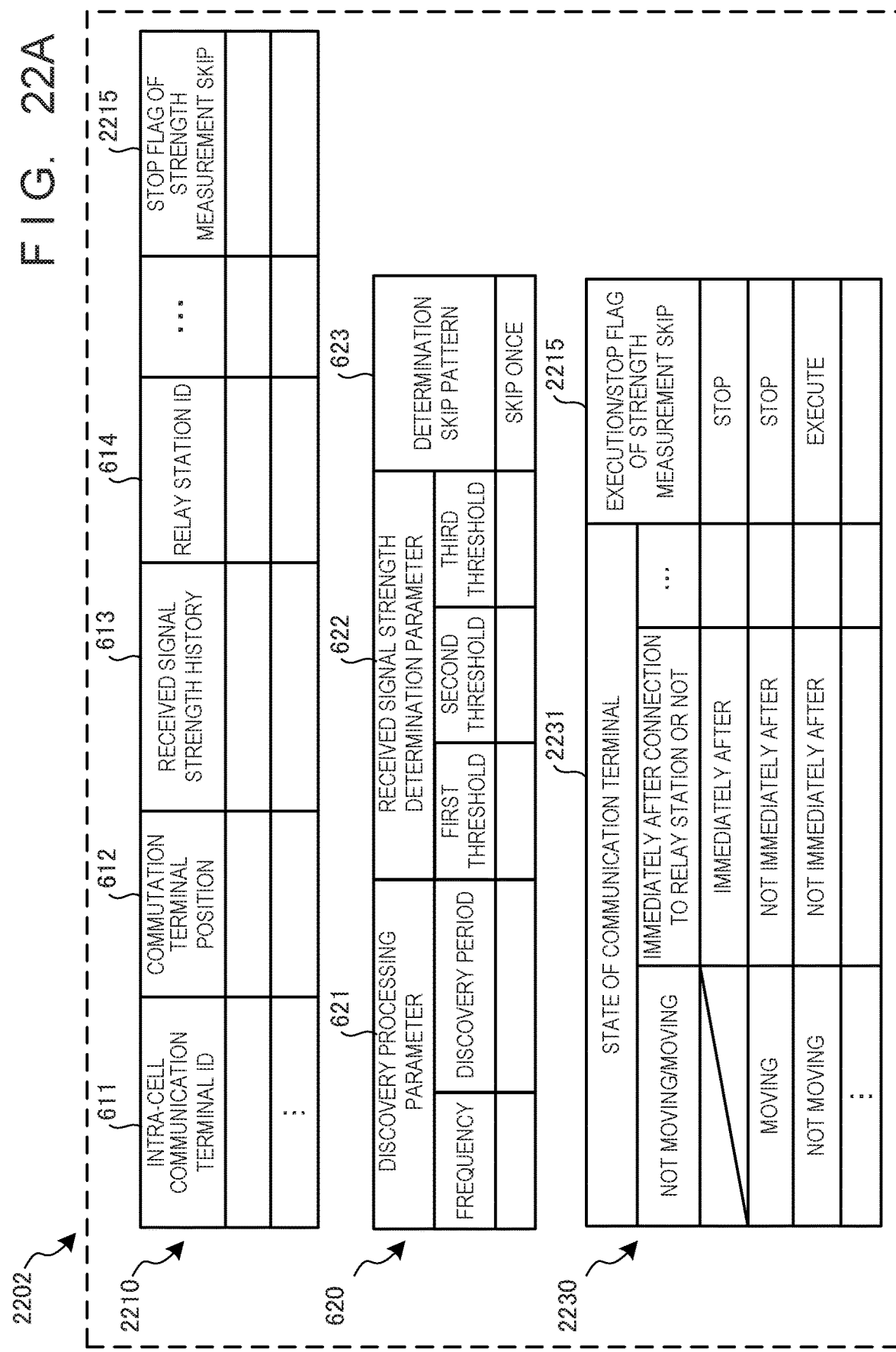
FIG. 22A is a view showing the arrangement of a base station database according to the fifth example embodiment of the present invention.

FIG. 22A is a view showing the arrangement of a base station database 2202 according to this example embodiment. Note that the same reference numerals as in FIG. 6 denote the same functional components in FIG. 22A, and a repetitive description thereof will be omitted.

The base station database 2202 includes a history storage portion 2210 that stores the information histories of a communication terminal 410 and a relay station 430 in a cell controlled by a communication processing apparatus 420, a parameter storage portion 620 that stores parameters used to implement control according to this example embodiment for the communication terminal 410 and the relay station 430 in the cell, and a skip suppression table 2230 used to suppress strength measurement skip based on the state of the communication terminal.

The history storage portion 2210 stores a stop flag 2215 of the strength measurement skip in association with a communication terminal ID 611 located in the cell.

The skip suppression table 2230 stores the execution/stop flag 2215 of the strength measurement skip based on a state 2231 of the communication terminal as a condition. The state 2231 of the communication terminal includes, for example, whether the communication terminal is not moving or is moving and whether the timing is immediately after connection to a relay station or not. However, the state is not limited to this example.

<<Processing Procedure of Communication Terminal (Remote UE)>>

Figure 22B:
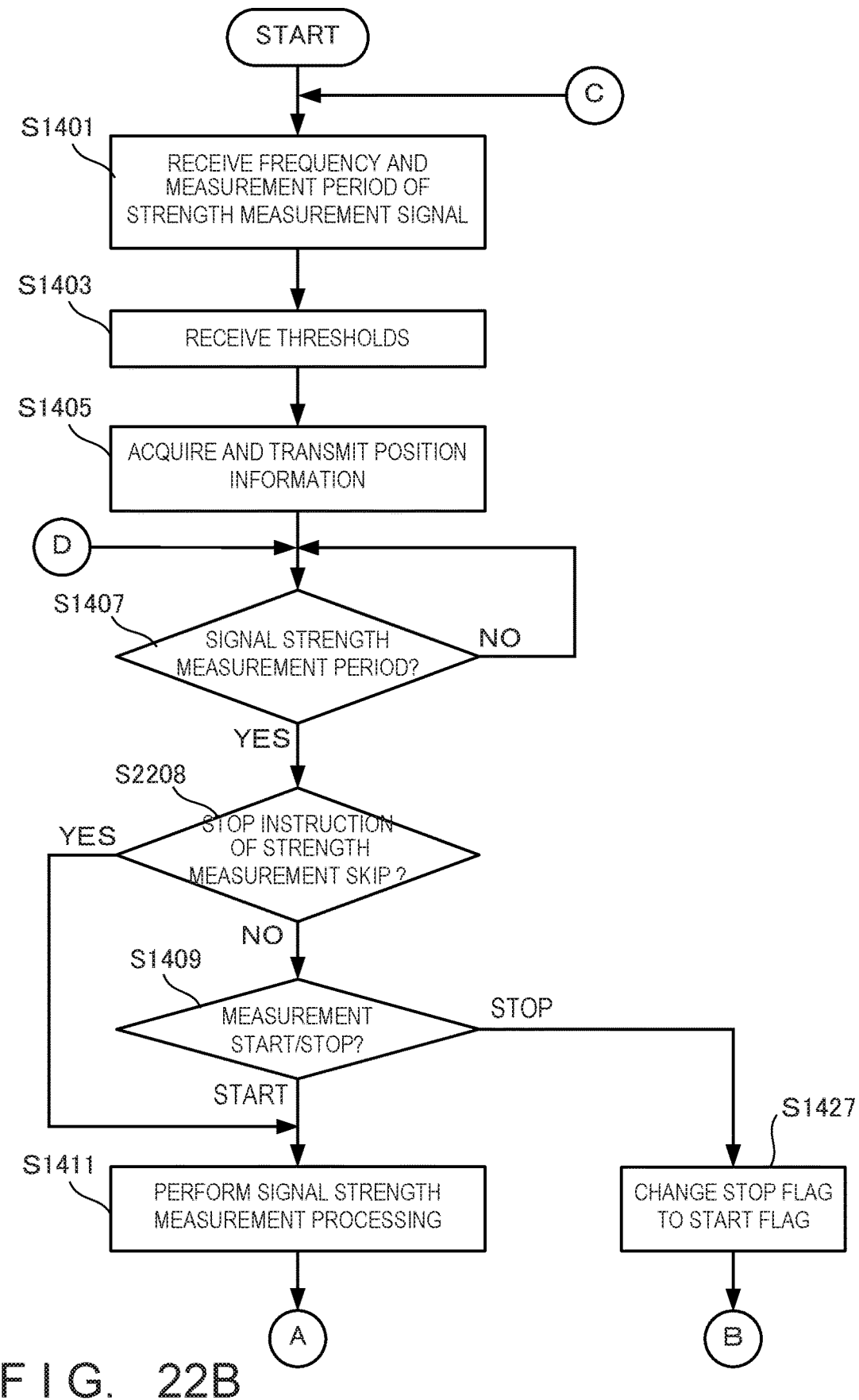
FIG. 22B is a flowchart showing the processing procedure of the communication terminal (remote UE) according to the fifth example embodiment of the present invention.

FIG. 22B is a flowchart showing the processing procedure of the communication terminal 410 (remote UE) according to this example embodiment. Note that the same step numbers as in FIG. 14A denote the same steps in FIG. 22B, and a repetitive description thereof will be omitted.

In step S2208, the communication terminal 410 determines whether a stop instruction of the strength measurement skip from the communication processing apparatus 420 (base station) is present. If the strength measurement skip stop instruction is present, the communication terminal 410 advances to step S1411, and does not perform the strength measurement skip. On the other hand, if the strength measurement skip stop instruction is not present, the communication terminal 410 advances to step S1409 to perform normal control of the strength measurement skip.

According to this example embodiment, it is possible to perform reduction of the measurement count on which the state of the communication terminal is reflected and reduce the power consumption of the remote UE associated with the measurement of the strength of the received signal.

Sixth Example Embodiment

A communication processing system according to the sixth example embodiment of the present invention will be described next. The communication processing system according to this example embodiment is different from the second to fifth example embodiments in that the measurement count is reduced by making the measurement period long in a case in which the strength of the received signal is stable. The rest of the components and operations is the same as in the second to fifth example embodiments. Hence, the same reference numerals denote the same components and operations, and a detailed description thereof will be omitted.

<<Outline of Operation of Communication Terminal>>

FIG. 23 is a view showing the operation of a communication terminal (remote UE) according to this example embodiment. In FIG. 23, in a case in which the strength of the received signal is stable (continuously exceeds the second threshold), the measurement period itself of the strength of the received signal is made long, thereby reducing the measurement count. In the example shown in FIG. 23, the measurement period of the strength of the received signal is changed to a double length. If the strength of the received signal does not continuously exceed the second threshold, the measurement period is returned to the original period. Note that determination by comparison with each threshold is the same as in the second example embodiment.

As the result of control according to this example embodiment, sequentially from the left of FIG. 23, measurement (between the second threshold and the third threshold: the next measurement is not stopped), measurement (larger than the second threshold: the next measurement is stopped), stop, measurement (larger than the second threshold: the next measurement is stopped+the measurement period is doubled), stop, measurement (between the second threshold and the third threshold: the stop of the next measurement is maintained+the measurement period is returned), stop, measurement (smaller than the third threshold: the next measurement is not stopped), measurement (larger than the second threshold: the next measurement is stopped), stop, . . . are performed. In this example embodiment, of the 12 received signal strength measurement periods using the initial measurement period, the measurement can be stopped at six periods because of the stable measured strength.

Furthermore, since processing concerning the control of the measurement period is also reduced, the power consumption of the remote UE is further reduced.

(Base Station Database)

Figure 24A:
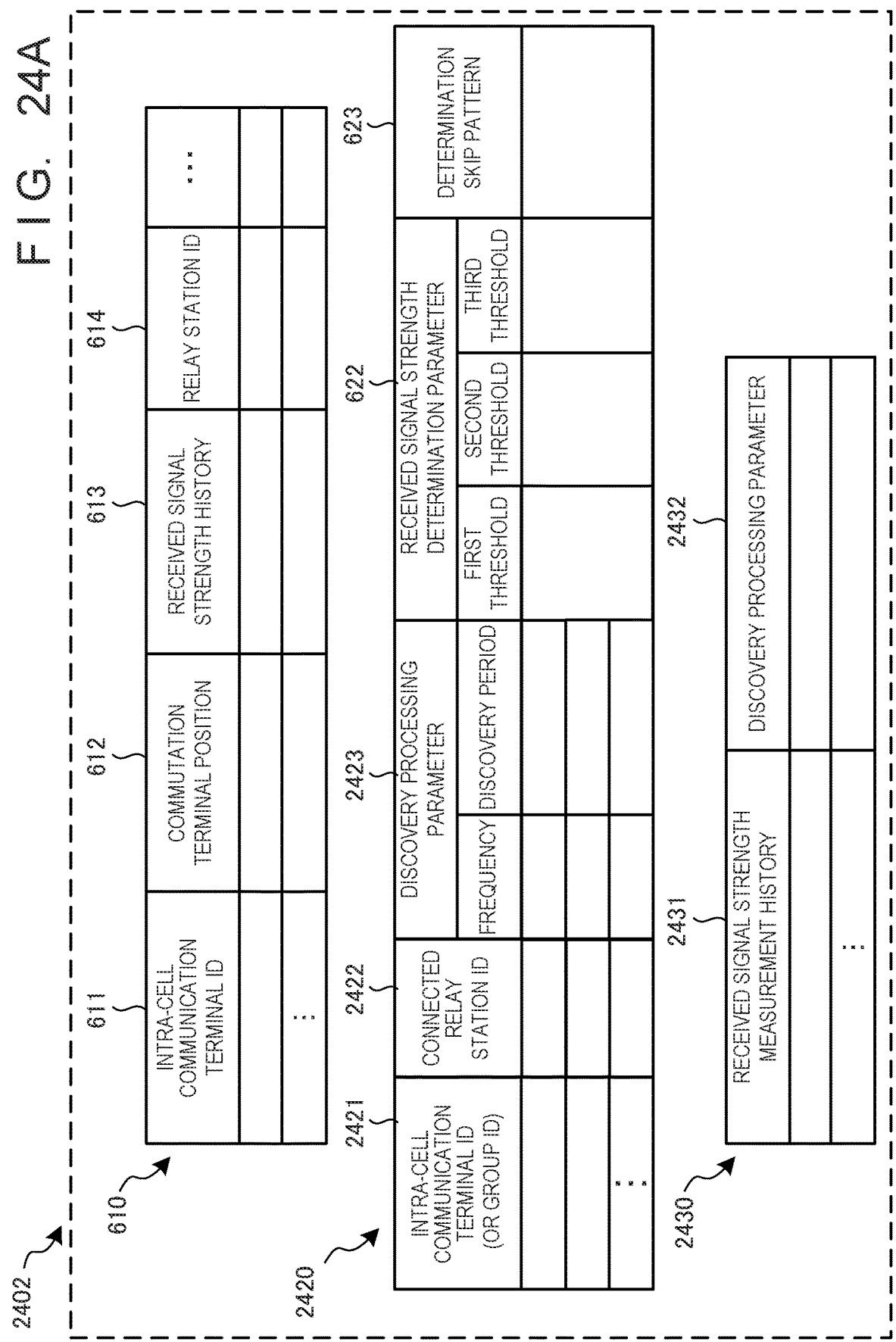
FIG. 24A is a view showing the arrangement of a base station database according to the sixth example embodiment of the present invention.

FIG. 24A is a view showing the arrangement of a base station database 2402 according to this example embodiment. Note that the same reference numerals as in FIG. 6 denote the same functional components in FIG. 24A, and a repetitive description thereof will be omitted.

The base station database 2402 includes a history storage portion 610 that stores the communication histories of a communication terminal 410 and a relay station 430 in a cell controlled by a communication processing apparatus 420, a parameter storage portion 2420 that stores parameters used to implement control according to this example embodiment for the communication terminal 410 and the relay station 430 in the cell, and a discovery parameter change table 2430 used to change a discovery processing parameter, particularly, the measurement period from the measurement history of the strength of the received signal.

The parameter storage portion 2420 stores a connected relay station ID 2422 and a discovery processing parameter 2423 in association with a communication terminal ID (or group ID) 2421 located in the cell.

The discovery parameter change table 2430 stores a discovery processing parameter 2432 in association with a measurement history 2431 of the strength of the received signal. The discovery processing parameter 2432 corresponding to the measurement history 2431 of the strength of the received signal is set to the discovery processing parameter 2423.

<<Processing Procedure of Communication Processing Apparatus>>

Figure 24B:
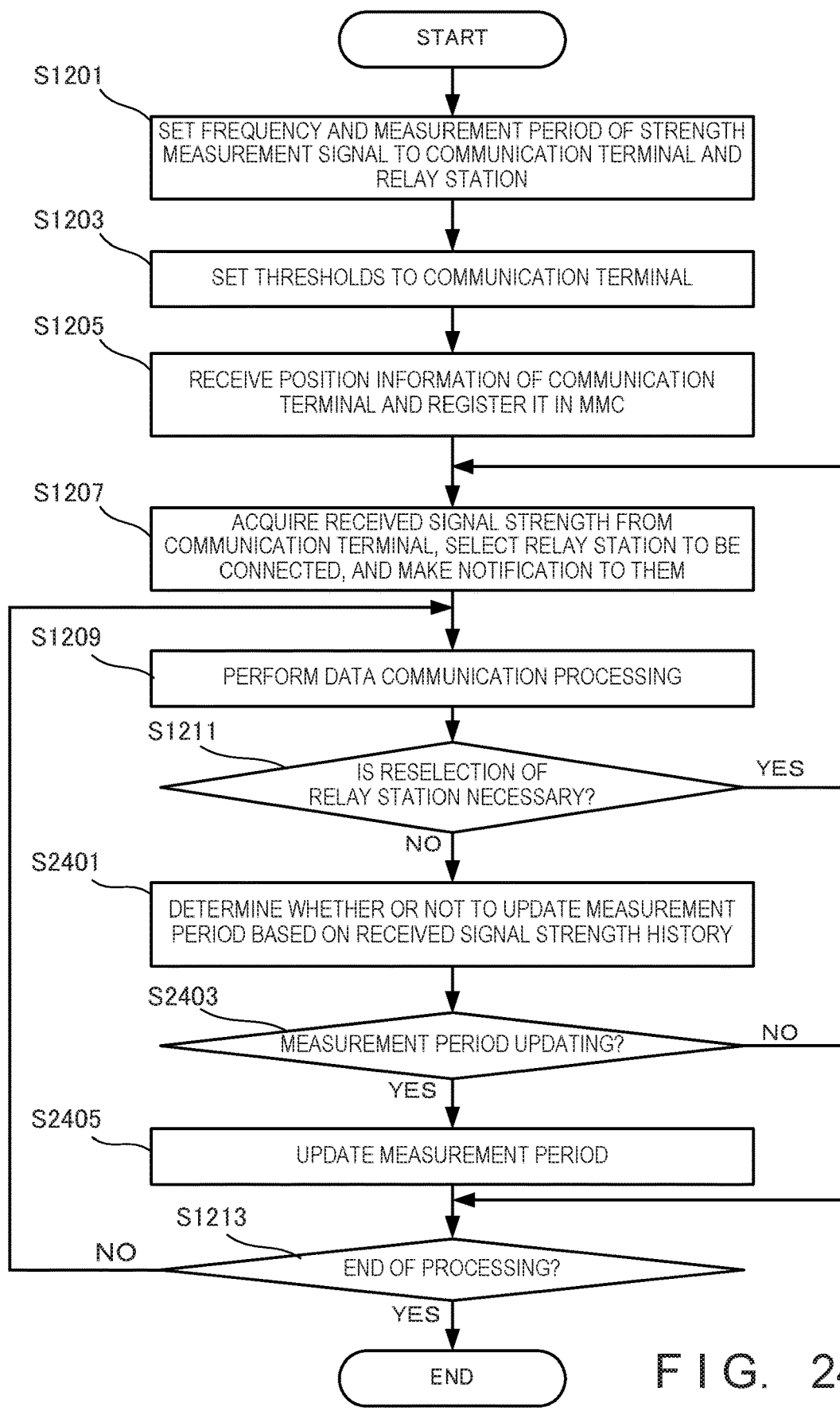
FIG. 24B is a flowchart showing the processing procedure of a communication processing apparatus (base station: eNB) according to the sixth example embodiment of the present invention.

FIG. 24B is a flowchart showing the processing procedure of the communication processing apparatus 420 (base station: eNB) according to this example embodiment. Note that the same step numbers as in FIG. 12 denote the same steps in FIG. 24B, and a repetitive description thereof will be omitted.

In step S2401, the communication processing apparatus 420 determines, based on the received signal strength history of the communication terminal, whether or not the measurement period needs to be updated. If the measurement period needs to be updated, the communication processing apparatus 420 advances from step S2403 to step S2405 to transmit the measurement period to be updated to the communication terminal. If the measurement period need not be updated, the communication processing apparatus 420 advances to step S1213 without doing anything.

According to this example embodiment, it is possible to perform more reduction of the measurement count on which the stability of the strength of the received signal is reflected and reduce the power consumption of the remote UE associated with the measurement of the strength of the received signal.

Seventh Example Embodiment

A communication processing system according to the seventh example embodiment of the present invention will be described next. The communication processing system according to this example embodiment is different from the second to sixth example embodiments in that reduction of the count of received signal strength measurement is controlled not by a base station but by each communication terminal. The rest of the components and operations is the same as in the second to sixth example embodiments. Hence, the same reference numerals denote the same components and operations, and a detailed description thereof will be omitted.

<<Operation of Communication Processing System>>

Figure 25:
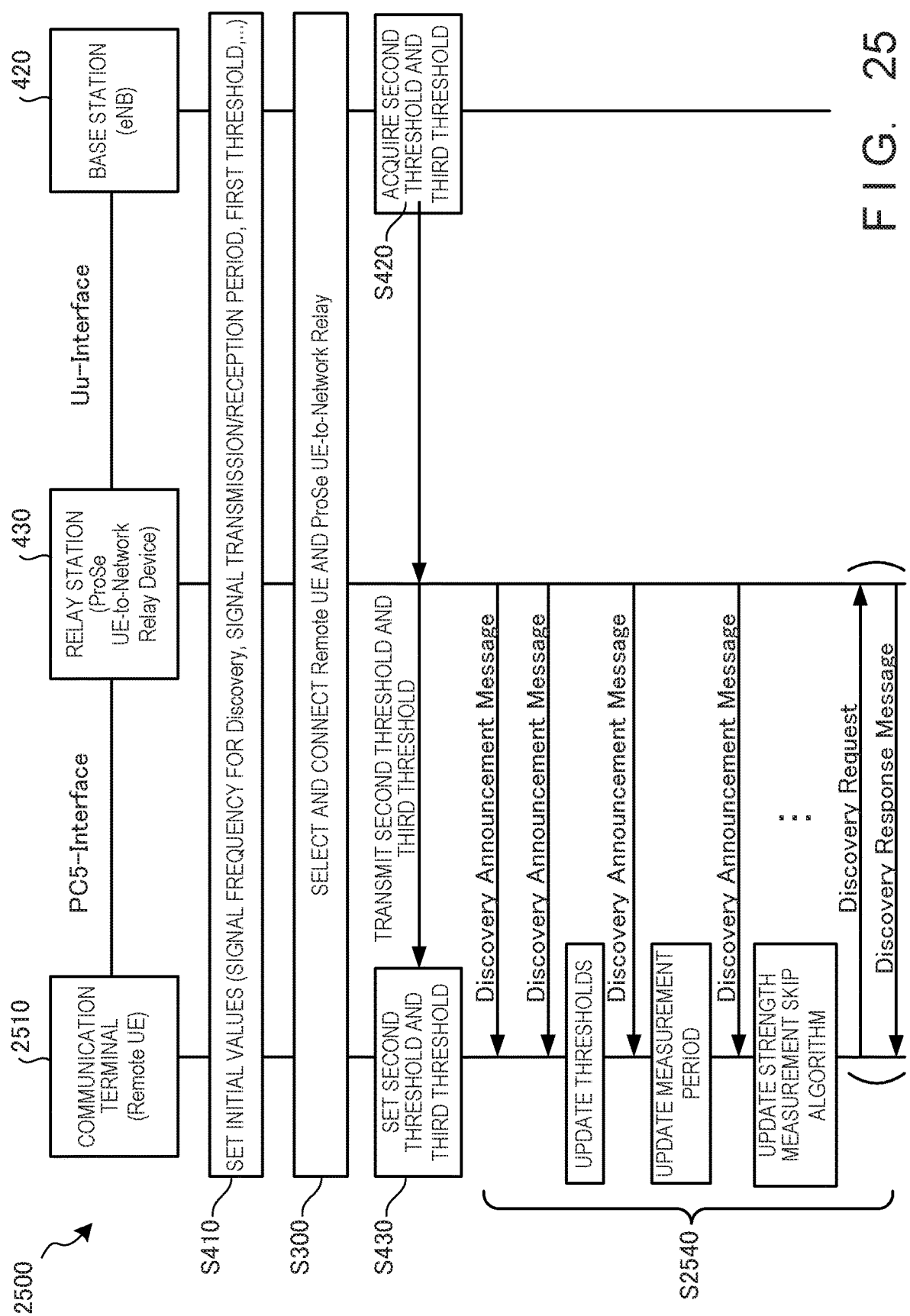
FIG. 25 is a sequence chart showing the operation of a communication processing system according to the seventh example embodiment of the present invention.

FIG. 25 is a sequence chart showing the operation of a communication processing system 2500 according to this example embodiment. Note that the same step numbers as in FIG. 4 denote the same steps in FIG. 25, and a repetitive description thereof will be omitted.

In step S2540, a communication terminal 2510 updates the thresholds, updates the measurement period, or updates the algorithm of strength measurement skip by itself based on the history of the measured received signal strength while continuing discovery processing. If necessary, a notification is made to the relay station or the base station.

<<Functional Arrangement of Communication Terminal>>

FIG. 26A is a block diagram showing the functional arrangement of the communication terminal 2510 (remote UE) according to this example embodiment. Note that the same reference numerals as in FIG. 8 denote the same functional components in FIG. 26A, and a repetitive description thereof will be omitted.

The communication terminal 2510 includes a communication terminal database 2602, a communication history storage unit 2607, and a communication processing parameter updater 2608. The communication terminal database 2602 accumulates data used to update the thresholds, update the measurement period, or update the algorithm of strength measurement skip by itself. The communication history storage unit 2607 acquires the communication history including the history of the measured received signal strength, and stores it in the communication terminal database 2602. The communication processing parameter updater 2608 updates communication processing parameters by referring to the communication history including the history of the strength of the received signal accumulated in the communication terminal database 2602.

<<Processing Procedure of Communication Terminal>>

Figure 26B:
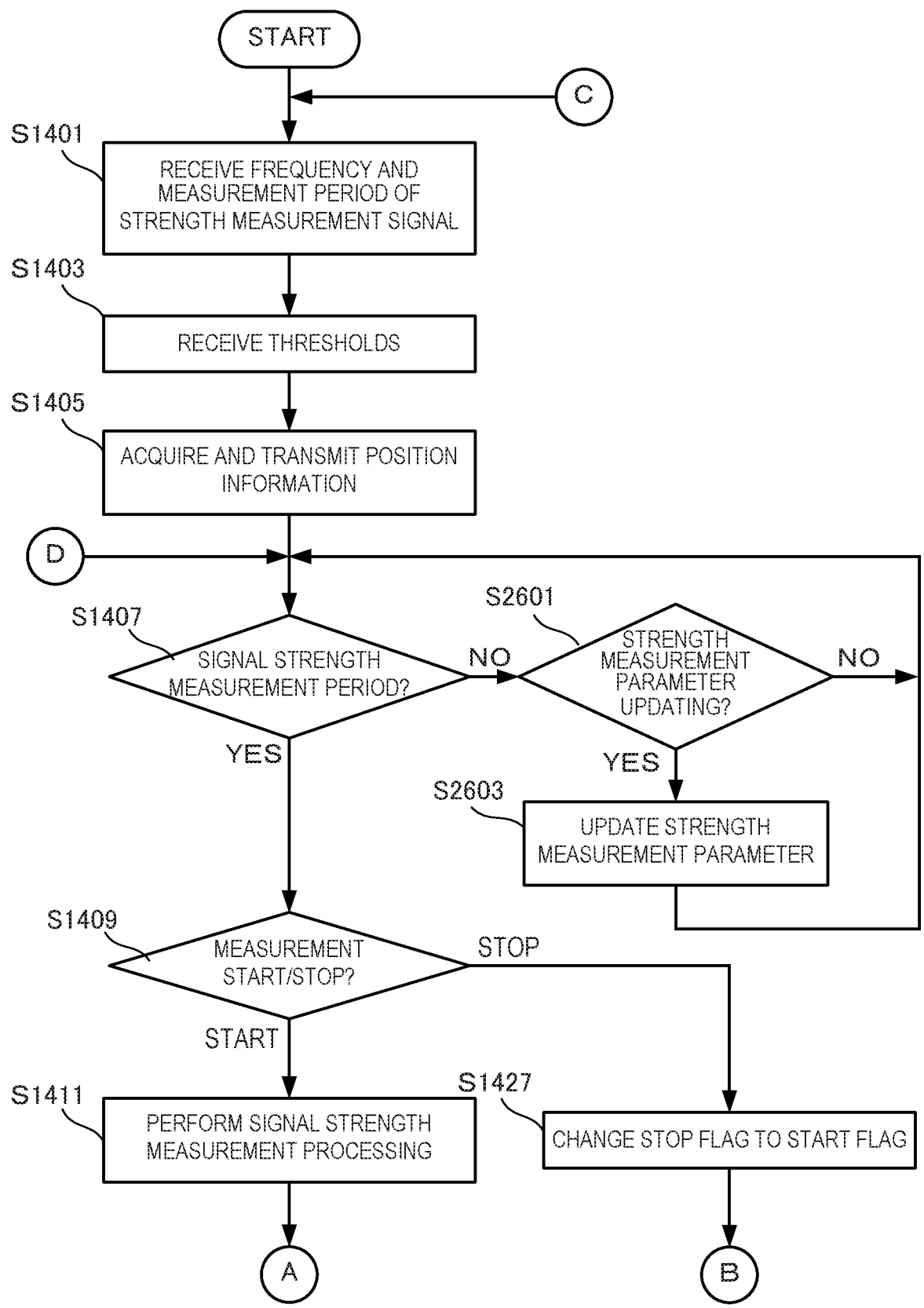
FIG. 26B is a flowchart showing the processing procedure of the communication terminal (remote UE) according to the seventh example embodiment of the present invention.

FIG. 26B is a flowchart showing the processing procedure of the communication terminal 2510 (remote UE) according to this example embodiment. Note that the same step numbers as in FIG. 14A denote the same steps in FIG. 26B, and a repetitive description thereof will be omitted.

In step S2601, the communication terminal 2510 determines whether the strength measurement parameter needs to be updated. If the strength measurement parameters needs to be updated, in step S2603, the communication terminal 2510 updates the strength measurement parameter and returns to step S1407 to wait for the next measurement period. On the other hand, if the strength measurement parameter need not be updated, the communication terminal 2510 returns to step S1407 to wait for the next measurement period without updating the strength measurement parameter.

According to this example embodiment, it is possible to reduce the measurement count uniquely by the communication terminal and reduce the power consumption of the remote UE associated with the measurement of the strength of the received signal.

OTHER EXAMPLE EMBODIMENTS

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

OTHER EXPRESSIONS OF EXAMPLE EMBODIMENTS

Some or all of the above-described embodiments can also be described as in the following supplementary notes but are not limited to the followings.

(Supplementary Note 1)

There is provided a communication processing system comprising:
 a communication terminal;
 a base station;

relay stations that relay communication between the communication terminal and the base station;

a measurer in the communication terminal that measures a strength of a signal received from one of the relay stations; and a controller that controls to reselect another of the relay stations if the measured strength of the received signal is smaller than a first threshold, and to reduce a count of measuring the strength of the received signal by the measurer if the measured strength of the received signal is larger than a second threshold which is larger than the first threshold.

(Supplementary Note 2)

There is provided the communication processing system according to supplementary note 1, wherein the controller controls to skip at least one subsequent measurement of the strength of the received signal if the measured strength of the received signal is larger than the second threshold.

(Supplementary Note 3)

There is provided the communication processing system according to supplementary note 2, wherein a number of continuous skips of the measurement of the strength of the received signal corresponds to a continuation count of a case in which the measured strength of the received signal is larger than the second threshold.

(Supplementary Note 4)

There is provided the communication processing system according to any one of supplementary notes 1 to 3, wherein the controller comprises a first setter that sets at least one of the first threshold and the second threshold based on a history of measuring the strength of the received signal.

(Supplementary Note 5)

There is provided the communication processing system according to any one of supplementary notes 1 to 4, wherein the controller controls to stop reduction of the count of measuring the strength of the received signal by the measurer if the measured strength of the received signal is smaller than a third threshold between the first threshold and the second threshold.

(Supplementary Note 6)

There is provided the communication processing system according to supplementary note 5, wherein the controller comprises a second setter that sets the third threshold based on the history of measuring the strength of the received signal.

(Supplementary Note 7)

There is provided the communication processing system according to any one of supplementary notes 1 to 6, wherein the controller further controls to reduce the count of measuring the strength of the received signal by the measurer in consideration of a current state of the communication terminal.

(Supplementary Note 8)

There is provided the communication processing system according to supplementary note 7, wherein the current state of the communication terminal includes whether the communication terminal is not moving or is moving, or whether a current stage is an early timing during connection between the communication terminal and the relay station.

(Supplementary Note 9)

There is provided the communication processing system according to any one of supplementary notes 1 to 8, wherein the controller comprises a third setter that sets a timing of measuring the strength of the received signal by the measurer based on the history of measuring the strength of the received signal.

(Supplementary Note 10)

There is provided the communication processing system according to any one of supplementary notes 1 to 9, wherein the communication terminal comprises a Remote UE in 3GPP TS 23.303 V 14.1.0, the base station comprises an eNB, and each of the relay stations comprises a ProSe UE-to-NW Relay, wherein the measurement of the strength of the received signal by the measurer is included in a Discovery Procedure.

(Supplementary Note 11)

There is provided the communication processing system according to any one of supplementary notes 1 to 10, wherein the communication terminal comprises an IoT device, an MTC device, and an M2M device.

(Supplementary Note 12)

There is provided a communication processing method of a communication processing system including a communication terminal, a base station, and relay stations that relay communication between the communication terminal and the base station, comprising:

measuring, in the communication terminal, a strength of a signal received from one of the relay stations; and controlling to reselect another of the relay stations if the measured strength of the received signal is smaller than a first threshold, and to reduce a count of measuring the strength of the received signal if the measured strength of the received signal is larger than the second threshold which is larger than the first threshold.

(Supplementary Note 13)

There is provided a communication terminal comprising:

a measurer that measures a strength of a signal received from one of relay stations that relay communication between the communication terminal and a base station; and a controller that controls to reselect another of the relay stations if the measured strength of the received signal is smaller than a first threshold, and to reduce a count of measuring the strength of the received signal by the measurer if the measured strength of the received signal is larger than the second threshold which is larger than the first threshold.

(Supplementary Note 14)

There is provided the communication terminal according to supplementary note 13, wherein the controller controls to stop reduction of the count of measuring the strength of the received signal by the measurer if the measured strength of the received signal is smaller than the third threshold which is larger than the first threshold.

(Supplementary Note 15)

There is provided a control method of a communication terminal, comprising:

measuring a strength of a signal received from one of relay stations that relay communication between the communication terminal and a base station; and controlling to reselect another of the relay stations if the measured strength of the received signal is smaller than a first threshold, and reduce a count of measuring the strength of the received signal if the measured strength of the received signal is larger than the second threshold which is larger than the first threshold.

(Supplementary Note 16)

There is provided a communication terminal control program for causing a computer to execute a method, comprising:

measuring a strength a signal received from one of relay stations that relay communication between a communication terminal and a base station; and controlling to reselect another of the relay stations if the measured strength of the received signal is smaller than a first threshold, and reduce a count of measuring the strength of the received signal if the measured strength of the received signal is larger than the second threshold which is larger than the first threshold.

(Supplementary Note 17)

There is provided a communication processing apparatus comprising:

a timing setter that sets, to a communication terminal and one of relay stations, a timing at which the communication terminal measures a strength of a signal received from the one of the relay stations that relay communication between the communication terminal and the communication processing apparatus;

a threshold setter that sets, to the communication terminal, a first threshold to be compared with the strength of the received signal measured by the communication terminal to determine whether or not to reselect another of the relay stations, and a second threshold used to control to reduce a count of measuring the strength of the received signal if the strength of the received signal measured by the communication terminal is larger than the second threshold which is larger than the first threshold; and an updater that updates setting of at least the second threshold based on a history of the strength of the received signal measured by the communication terminal.

(Supplementary Note 18)

There is provided the communication processing apparatus according to supplementary note 17, wherein the threshold setter further sets a third threshold used to stop reducing the count of measuring the strength of the received signal if the strength of the received signal measured by the communication terminal is smaller than the third threshold between the first threshold and the second threshold, and the updater further updates setting of the third threshold based on the history of the strength of the received signal measured by the communication terminal.

(Supplementary Note 19)

There is provided a control method of a communication processing apparatus, comprising:

setting, to a communication terminal and one of relay stations, a timing at which the communication terminal measures a strength of a signal received from the one of the relay stations that relay communication between the communication terminal and the communication processing apparatus;

setting, to the communication terminal, a first threshold to be compared with the strength of the received signal measured by the communication terminal to determine whether or not to reselect another of the relay stations, and a second threshold used to control to reduce a count of measuring the strength of the received signal if the strength of the received signal measured by the communication terminal is larger than the second threshold which is larger than the first threshold; and updating setting of at least the second threshold based on a history of the strength of the received signal measured by the communication terminal.

(Supplementary Note 20)

There is provided a communication processing apparatus control program for causing a computer to execute a method, comprising:

setting, to a communication terminal and one of relay stations, a timing at which the communication terminal measures a strength of a signal received from the one of the relay stations that relay communication between the communication terminal and the communication processing apparatus;

setting, to the communication terminal, a first threshold to be compared with the strength of the received signal measured by the communication terminal to determine whether or not to reselect another of the relay stations, and a second threshold used to control to reduce a count of measuring the strength of the received signal if the strength of the received signal measured by the communication terminal is larger than the second threshold which is larger than the first threshold; and updating setting of at least the second threshold based on a history of the strength of the received signal measured by the communication terminal.

The invention claimed is:

1. A communication processing method of a communication processing system including a communication terminal, a base station, and relay stations that relay communication between the communication terminal and the base station, comprising:

measuring, in the communication terminal, a strength of a signal received from one of the relay stations; and controlling to reselect another of the relay stations if the measured strength of the received signal is smaller than a first threshold, and to reduce a count of measuring the strength of the received signal if the measured strength of the received signal is larger than the second threshold which is larger than the first threshold, wherein reduction of the count of measuring the strength of the received signal is controlled to stop if the measured strength of the received signal is smaller than a third threshold between the first threshold and the second threshold.

2. A communication terminal comprising:

a measurer that measures a strength of a signal received from one of relay stations that relay communication between the communication terminal and a base station; and a controller that controls to reselect another of the relay stations if the measured strength of the received signal is smaller than a first threshold, and to reduce a count of measuring the strength of the received signal by the measurer if the measured strength of the received signal is larger than the second threshold which is larger than the first threshold, wherein the controller controls to stop reduction of the count of measuring the strength of the received signal by the measurer if the measured strength of the received signal is smaller than a third threshold between the first threshold and the second threshold.

3. The communication terminal according to claim 2, wherein the controller controls to skip at least one subsequent measurement of the strength of the received signal if the measured strength of the received signal is larger than the second threshold.

4. The communication terminal according to claim 3, wherein a number of continuous skips of the measurement of the strength of the received signal corresponds to a continuation count of a case in which the measured strength of the received signal is larger than the second threshold.

5. The communication terminal according to claim 2, wherein the controller comprises a first setter that sets at least one of the first threshold and the second threshold based on a history of measuring the strength of the received signal.

6. The communication terminal according to claim 2, wherein the controller comprises a second setter that sets the third threshold based on the history of measuring the strength of the received signal.

7. The communication terminal according to claim 2, wherein the controller further controls to reduce the count of measuring the strength of the received signal by the measurer in consideration of a current state of the communication terminal.

8. The communication terminal according to claim 7, wherein the current state of the communication terminal includes whether the communication terminal is not moving or is moving, or whether a current stage is an early timing during connection between the communication terminal and the relay station.

9. The communication terminal according to claim 2, wherein the controller comprises a third setter that sets a timing of measuring the strength of the received signal by the measurer based on the history of measuring the strength of the received signal.

10. The communication terminal according to claim 2, wherein the communication terminal comprises a Remote UE in 3GPP TS 23.303 V14.1.0, the base station comprises an eNB, and each of the relay stations comprises a ProSe UE-to-NW Relay, wherein the measurement of the strength of the received signal by the measurer is included in a Discovery Procedure.

11. The communication terminal according to claim 2, wherein the communication terminal comprises an IoT device, an MTC device, and an M2M device.

12. A communication processing apparatus comprising:
a timing setter that sets, to a communication terminal and one of relay stations, a timing at which the communication terminal measures a strength of a signal received from the one of the relay stations that relay communication between the communication terminal and the communication processing apparatus;
a threshold setter that sets, to the communication terminal, a first threshold to be compared with the strength of the received signal measured by the communication terminal to determine whether or not to reselect another of the relay stations, and a second threshold used to control to reduce a count of measuring the strength of the received signal if the strength of the received signal measured by the communication terminal is larger than the second threshold which is larger than the first threshold; and
an updater that updates setting of at least the second threshold based on a history of the strength of the received signal measured by the communication terminal,
the threshold setter further sets a third threshold used to stop reducing the count of measuring the strength of the received signal if the strength of the received signal measured by the communication terminal is smaller than the third threshold between the first threshold and the second threshold, and
the updater further updates setting of the third threshold based on the history of the strength of the received signal measured by the communication terminal.

* * * * *